United States Patent

Pau

[11] Patent Number: 6,023,295
[45] Date of Patent: Feb. 8, 2000

[54] ADPCM RECOMPRESSION AND DECOMPRESSION OF A DATA STREAM OF A VIDEO IMAGE AND DIFFERENTIAL VARIANCE ESTIMATOR

[75] Inventor: Danilo Pau, Sesto S. Giovanni, Italy

[73] Assignee: SGS-Thomson Microelectronics S.r.l., Agrate Brianza, Italy

[21] Appl. No.: 08/926,352

[22] Filed: Sep. 9, 1997

[30] Foreign Application Priority Data

Sep. 12, 1996 [IT] Italy .................................. VA96A0016

[51] Int. Cl.[7] ........................................................ H04N 7/32
[52] U.S. Cl. .............................................................. 348/405
[58] Field of Search .................................... 348/384, 390, 348/400, 401, 402, 405, 409, 415, 416, 419; 382/232, 233, 236, 238, 251

[56] References Cited

U.S. PATENT DOCUMENTS 5,583,573  12/1996  Asamura .................. 348/405

FOREIGN PATENT DOCUMENTS 10-243402  9/1998  Japan .............................. H04N 7/32
11-98512   4/1999  Japan .............................. H04N 7/32

*Primary Examiner*—Bryan Tung
*Attorney, Agent, or Firm*—Allen, Dyer, Doppelt, Milbrath & Gilchrist, P.A.

[57] ABSTRACT

The video memory requirement of an MPEG decoder, or of an SQTV processor, or of similar devices, wherein the storing of full pages or pixels or portions thereof is performed in decoding or in filtering noise, may be dynamically reduced by ADPCM recompressing and decompressing of the MPEG decoded digital data stream, before and after storing the data in the video memory, respectively. A particularly efficient and simple ADPCM compression method employs a differential variance estimator which, instead of processing bidimensional blocks of pels, instead processes blocks of pels all belonging to a same horizontal video line.

11 Claims, 23 Drawing Sheets

ADPCM RECOMPRESSION AND DECOMPRESSION OF A DATA STREAM OF A VIDEO IMAGE AND DIFFERENTIAL VARIANCE ESTIMATOR

FIELD OF THE INVENTION

The present invention relates in general to digital processing systems of video signals received for displaying or recording video images, and, more particularly to MPEG decoders and integrated devices commonly referred to as Improved Quality TeleVision processors" (IQTV) or "Smart Quality TeleVision processors" (SQTV), in which systems, full pages or portions of video pages are momentarily stored during the decoding process.

BACKGROUND OF THE INVENTION

The MPEG-1 standard was developed in response to the industry need of implementing an efficient way of storing and retrieving video information on storage media of the digital type, as for example CD-ROMs. Of course, the MPEG-1 standard is also a powerful tool for efficiently storing data on similar media such as DATs, Winchester disks, optical disks and ISDN and LAN networks. A more efficient version of the standard called MPEG has been developed in support of bitrate requisites in the field of digital video transmission applications. The standard has been generally accepted for digital TV systems, for compressing TV-resolution pictures entirely interlaced and up to a bitrate of about 15 Mbps. A special version of the MPEG standard is expected to be used in future generation HDVT systems.

The MPEG standard incorporates and uses important algorithms and criteria defined by previous international standards, such as, for example, the CCITT motion vectors determination algorithm H.261 and the ISO 10918 standard of the ISO JPEG Committee for the coding of still pictures. A definition of the MPEG standard (1 and 2), and a thorough description of the different application techniques and the relative coding and decoding systems of the data relative compressed video pictures according to the MPEG standards are described in a wealth of articles and publications on the subject, including the following:

Draft International ISO/IEC DIS 13818-2 "Information technology-Generic coding of moving pictures and associated audio information".

"MPEG coding and transport system" by Leonardo Chiariglione, Digital Television Broadcasting-Proceedings.

"The MPEG video compression algorithm" by Didier J. Le Gall, Signal Processing Image Communication, Elsevier Science Publishers B. V., Vol. 4, No. 2, April 1992.

Digest No. 1995/012, Electronics Division, Institution of Electrical Engineers-London, Colloquium on: "MPEG-2—what it is and what it isn'2".

"An Overview of the MPEG-2 Compression Algorithm" Technical Note released by SGS-THOMSON MICROELECTRONICS (An 529/0294).

Datasheet "STi3500A" Datasheet of SGS-THOMSON MICROELECTRONICS.

"STi3520A—Advanced Information for an MPEG Audio/MPEG-2 Video Integrated Decoder" (June 1995).

According to a typical architecture of an MPEG-2 decoder, such as that shown in FIG. 3 of the publication No. STi3520A relative to an MPEG Audio/MPEG-2 Video integrated decoder marketed by SGS-THOMSON MICROELECTRONICS, herein reproduced as FIG. 1, there exist well-defined requirements of video memory. These requirements, that is, the capacity of an external DRAM memory that, for a PAL and NTSC application can support 16 Mbits PAL video signals, can be estimated as follows.

Considering that both the MPEG-2 video decoder and the MPEG audio decoder access a unique external DRAM memory of 16 Mbits through a common interface, the audio decoder may require access to only 131.072 bits thereby leaving the remaining 16.646.144 bits available for satisfying the requisites of the MPEG-2 video decoder. The video memory can be configured as follows:

A "Bit buffer": that is a buffer for compressed data that the MPEG-2 standard fixes at 1.75 Mbits plus an extra amount, for example, of 983.040 bits, in consideration of a nonideal process of decompression being actually carried out.

A first "I-frame buffer" for the decompressed Intra-picture or briefly I-picture, in a 4:2:0 format.

A second "P-frame buffer" for the decompressed Predicted-picture or briefly P-picture, in a 4:2:0 format.

A third "B-frame buffer" for the decompressed Bidirectionally Predicted Picture or briefly B-picture, in a 4:2:0 format, eventually optimized so to require a reduced amount of memory, which is 0.7407 or 0.6111 of a frame, respectively, in a PAL or NTSC system.

According to the actual MPEG-2 standard technique, and despite dealing with an I, P or B-picture, dependently on the type of video standard, each "frame buffer" in the 4:2:0 format may occupy an amount of memory given by the following table.

| | | |
|---|---|---|
| PAL | 720 × 576 × 8 for the luma (luminance) (Y) | 3.317.760 bits = 4.976.640 bits |
| | 360 × 288 × 8 for the U chroma (chrominance U) | 829.440 bits |
| | 360 × 288 × 8 for the V chroma (chrominance V) | 829.440 bits |
| NTSC | 720 × 480 × 8 for the luma (luminance) (Y) | 2.764.800 bits = 4.147.200 bits |
| | 360 × 240 × 8 for the U chroma (chrominance U) | 691.200 bits |
| | 360 × 240 × 8 for the V chroma (chrominance V) | 691.200 bits |

Therefore, in a PAL system, which representing the most burdensome case may serve as a reference example, the actual total amount of memory required will be given by: 1.835.008+835.584+4.976.640+4.976.640+ (4.976.640*0.7407)=16.310.070 bits. This calculation considers a 0.7407 optimization of the B-picture frame buffer.

A further optimization may include undertaking the decompression of the B-picture without resorting to a storage step in the external RAM by carrying out an equivalent function internally in the integrated decoder device by a dedicated circuit block functionally placed upstream of the Display Unit.

Considering this further optimization, the video RAM requirement drops to:

1.835.008+835.584+4.976.640+4.976.640=12.623.872 bits where the B-buffer is realized within the same chip containing the "core" of the decoder being required to convert the scanning of each 8*8 block, defined in the MPEG-2 compressed data stream, in that of each row of the picture (field or frame) required by the video display process of the picture itself. Such conversion macrocell is commonly called "MACROBLOCK TO RASTER SCAN CONVERTER".

In European patent application No. 96830106.9, filed on 11 Mar. 1996 (corresponding to U.S. application Ser. No. 08/758,805 filed Dec. 3, 1996), in the name of the same assignee, a method and relative device were described that allow a significant reduction of the above cited video memory requirement down to about 8 Mbits.

The idea behind the invention described and claimed in the above identified prior patent application is the recognition that the amount of memory required by the MPEG decoding process as stated in the above calculations can be remarkably reduced when allowing for a recompression of the pictures used as a reference for the prediction (I-picture and P-picture for the case of the standards MPEG-1 and MPEG-2), after the MPEG decompression and before they are temporarily stored in the external video memory and their decompression when they are read from the external memory. On the other hand, digital TV receivers commonly employ an integrated system that is generally known as "Improved Quality Television processor" (IQTV) or "Smart Quality Television processor" (SQTV), which requires storing of whole pictures or parts of them to process them during the decoding phase. These integrated systems are increasingly employed in video receivers to improve image quality without requiring changes in the relevant transmission standards (PAL, NTSC, SECAM).

In practice, luminance (Y) and chrominance-U and chrominance-V (UV) analog components of the video signal are digitized through analog-to-digital converters and the digital data obtained, concerning the two fields into which the video signal is generally divided, are stored in a dedicated memory. This allows, first, a conversion from 50 or 60 Hz to 100 or 120 Hz of the interlaced scanning frequency (in practice the so-called "refresh-rate") so to make flickering imperceptible.

Moreover, digital values relevant to each pixel of each line forming each field so stored in the memory enable implementing appropriate algorithms for reducing Gaussian and spike or pulse noise. Through memory duplication it is also possible to implement a compensation (elimination) loop for blurring of objects moving fast on a background by employing an algorithm that contemplates the calculation of average values among the values of pixels relating to successive pictures. This eliminates non-correlated contents of the video signal and correction algorithms based on motion detection. The field memory or memories are normally DRAM devices which, according to the present limits of manufacturing technologies, are external to the integrated device containing the processing circuits (generally called SQTV_IC or IQTV_IC).

A common video receiver includes a tuning section that selects the channel and the relevant frequency band of the signal transmitted via cable, satellite, or is broadcast. The tuner converts the received signal to an intermediate video frequency (for example 38.9 MHz according to the Italian standard) containing luminance and chrominance data multiplexed in frequency. A demodulation block processes the signal converted at the intermediate frequency producing a base band composite video signal which, in turn, is selected by a selector of the input signal source and which feeds the standard decoder (PAL, NTSC, SECAM) carrying out the separation of luminance and chrominance components.

Analog signals relevant to luminance (Y) and chrominance (UV) are thus converted through appropriate analog-to-digital converters to produce a luminance (Y) digital data stream and a chrominance (UV) digital data stream which are fed to the IQTV_IC (or SQTV_IC) device. Each FIELD MEMORY may store a picture field in the 4:2:2 format or in the 4:1:1 format, thus occupying the following memory space.

| | | | |
|---|---|---|---|
| PAL | 720 × 288 × 8 for luma (luminance) (Y) | 1,658,880 bits | = 3,317,760 bits |
| | 360 × 288 × 8 for U chroma (chrominance U) | 829,440 bits | |
| | 360 × 288 × 8 for chroma (chrominance V) | 829,440 bits | |
| NTSC | 720 × 240 × 8 for luma (luminance) (Y) | 1,382,400 bits | = 2,764,800 bits |
| | 360 × 240 × 8 for U chroma (chrominance U) | 691,200 bits | |
| | 360 × 240 × 8 for chroma (chrominance V) | 691,200 bits | |

In the case of a PAL transmission system which, being the more critical standard, can be taken as a reference example, the total requisite when employing two field memories becomes 3,317,760*2=6,635,520 bits.

Even for this type of application, there is the need or usefulness to reduce this memory requisite of a SQTV_IC (or IQTV_IC) without causing a perceivable visual deterioration of images. This would be desirable to save costs and/or create more suitable opportunities for the integration of the field memory in the same IQTV_IC (or SQTV_IC) chip through improvements of manufacturing processes.

In another preceding patent application of the same assignee: EP-96830134.1, of Mar. 20, 1996 (corresponding to U.S. application Ser. No. 08/810,029, filed Mar. 4, 1997), an IQTV-IC system is disclosed which implements a compressing and coding according to an adaptive differential pulse code modulation scheme (ADPCM) of the digital data relevant to a field in a 4:2:2 or in a 4:1:1 format of a picture to be stored in the relevant field memory at a 50 or 60 Hz standard frequency. The application further disclosures an ADPCM decoding and decompressing of the data read from the field memory at a multiple frequency (generally double) of the frequency at which the data are written in the field memory.

The ADPCM compression mechanism takes advantage of the correlation existing between adjacent pixel values of a picture to reduce the number of bits required for a binary representation of the picture itself. In fact, it is possible to approximate the pixel values by suitably combining only the value of pixels adjacent thereto (therefore, not using (storing) the actual pixel value), that is, by implementing a so-called "prediction" of the pixel itself.

Therefore, it is possible to reduce the quantity of binary figures required for the digital representation of a picture by defining the prediction mechanism and therefore duly coding (and storing) the prediction error only instead of each pixel. The more accurate the prediction of the pixel value, the lower the entropy of the prediction error will be, or the lower the number of bits required to code it will be.

The method described in the above mentioned prior patent application permits in practice to more than halve the RAM memory requirement for the storing of the field or fields, and with an almost neglectible loss in the quality of reconstructed images since artifacts are mainly distributed at high frequencies. In both the systems described in the prior patent applications, a significative feature was the presence of an ADPCM coder that recompressed the MPEG decoded digital video data, before storing it in the respective buffer to reduce the video memory requisite.

The variance estimator is that portion of an ADPCM coder that performs an estimation of the power of the video signal contained in the portion of the data stream being compressed. In fact, according to an ADPCM technique, the compression "engine" is represented by a parametric quantizer. The set of parameters or coefficients used by the parametric quantizer depend from the power of the video block and each of the sets of parameters or coefficients correspond to a precise address of a dedicated read only memory (look-up table) containing them. These sets of parameters or coefficients are precalculated and loaded in a dedicated ROM or PAL device. Therefore, the variance estimator provides the address of the ROM or PAL containing the parameters which permit the quantizer to compress the preevaluated block of video data with an error that is smaller the more precisely the appropriate set of precalculated parameters are specific.

A way of ADPCM compressing data relative to a digital video signal as described in the above mentioned prior patent applications is based on the following criteria. By considering an 8*8 (8 columns and 8 rows) block of pels, let us calculate the differences of moduli of adjacent pels of the same row; and to calculate also the differences among adjacent pels belonging to a first column of the 8*8 block. In the following table the considered video block is shown in the left-hand side, while the block in the right-hand side shows the differences of moduli among adjacent pels:

| A1 | A2 | A3 | A4 | A5 | A6 | A7 | A8 | 0 | A(1–2) | A(2–3) | A(3–4) | A(4–5) | A(5–6) | A(6–7) | A(7–8) |
| B1 | B2 | B3 | B4 | B5 | B6 | B7 | B8 | B1–A1 | B(1–2) | B(2–3) | B(3–4) | B(4–5) | B(5–6) | B(6–7) | B(7–8) |
| C1 | C2 | C3 | C4 | C5 | C6 | C7 | C8 | C1–B1 | C(1–2) | C(2–3) | C(3–4) | C(4–5) | C(5–6) | C(6–7) | C(7–8) |
| D1 | D2 | D3 | D4 | D5 | D6 | D7 | D8 | D1–C1 | D(1–2) | D(2–3) | D(3–4) | D(4–5) | D(5–6) | D(6–7) | D(7–8) |
| E1 | E2 | E3 | E4 | E5 | E6 | E7 | E8 | E1–D1 | E(1–2) | E(2–3) | E(3–4) | E(4–5) | E(5–6) | E(6–7) | E(7–8) |
| F1 | F2 | F3 | F4 | F5 | F6 | F7 | F8 | F1–E1 | F(1–2) | F(2–3) | F(3–4) | F(4–5) | F(5–6) | F(6–7) | F(7–8) |
| G1 | G2 | G3 | G4 | G5 | G6 | G7 | G8 | G1–F1 | G(1–2) | G(2–3) | G(3–4) | G(4–5) | G(5–6) | G(6–7) | G(7–8) |
| H1 | H2 | H3 | H4 | H5 | H6 | H7 | H8 | H1–G1 | H(1–2) | H(2–3) | H(3–4) | H(4–5) | H(5–6) | H(6–7) | H(7–8) |

Let us sum the differences, divide the result by 64(8*8), and finally multiply the result by a correction coefficient. The result is the address of the ROM containing precalculated sets of coefficients of quantization. The reading of these coefficients initializes a quantizer that, according to an ADPCM technique, compresses the video block depicted in the left-hand side portion of the above table according to the criteria shown in the right-hand side block of the table.

In the cited prior patent application EP-96830367.7, filed on Jun. 28, 1996 (corresponding to U.S. application Ser. No. 08/880,260), a method and relative device were described which provided for a further reduction of the video memory requisite. This was accomplished through the performance of a subsampling operation of the data before recompressing them with an ADPCM technique, at least for the I and P pictures, after MPEG-2 decompression, and before storing the ADPCM recompressed data in respective buffers of the video memory. Subsequently, during reconstruction of the blocks of pels to be sent to a "MACROBLOCK-SCAN TO RASTER-SCAN" conversion unit, the decoded and decompressed data were oversampled congruently with the subsampling factor that was used for subsampling them before ADPCM recompression.

SUMMARY OF THE INVENTION

In view of the foregoing background, it is therefor an object of the present invention to provide an alternative method to the method described in the above-mentioned European patent application for reducing the video memory requisite.

The method of the present invention is based on a particularly straightforward algorithm which is easily implemented and which maintains a high quality of the image, though permitting a significative reduction of the video memory requirement. The system of the present invention is useful in ADPCM recompressing a stream of digital video data in an MPEG decoder system, as well as in a so-called IQTV or SQTV processor.

Differently from the algorithm that is commonly used in prior art systems and which is based on the processing by blocks, typically of bidimensional format, of pels (pels being a contraction of the term pixel), the method of the present invention operates by blocks or sets of pels all belonging to a same horizontal video line. In practice, the algorithm of the invention operates in a monodimensional mode, contrarily to the bidimensional mode of conventional video data processing systems. From this results a significant simplification of the ADPCM recompression-decompression process and a consequent marked reduction of the video memory requisite. This is achieved without any perceptible loss of quality of the reproduced images.

Let us consider a set of 16 pels belonging to a certain horizontal video line:

. . . A1 A2 A3 A4 A5 A6 A7 A8 A9 A10 A11 A12 A13 A14 A5 A16 . . .

By calculating the moduli of the differences among adjacent pels, the following data are obtained:

| A1–A2 | A2–A3 | A3–A4 | A4–A5 | A5–A6 | A6–A7 | A7–A8 |
| A8–A9 | A9–A10 | A10–A11 | A11–A12 | A12–A13 | A13–A14 | A14–A15 |
| A15–A16 | | | | | | |

The maximum value of these differences is compared with 17 thresholds defining 16 ranges. Therefore, once the range to which the block of pels being taken into consideration is identified, the variance estimator outputs the address of the dedicated buffer that identifies the appropriate set of coefficients for initializing the parametric quantizer of the ADPCM compression system. Therefore, to the 16 ranges correspond 16 addresses in a dedicated ROM or PAL, which may then be more compact than the one required in the prior art systems.

The structure of the differential variance estimator of a digital video signal processing system according to the present invention implements the above-described algorithm and its functional structure may be described, in general terms, as follows. By considering as an example an 8 bit coding for each pel, each pel at the input of the variance estimator is retarded by a primary clock period by the use of a suitable synchronized bistable circuit, such as, for example, a flip-flop. This permits feeding at the same instant, with two adjacent pels, a subtractor circuit which feeds a circuit for the calculation of the absolute value (modulus) of the difference. The signal output by the calculation circuit of the modulus of the difference between every two adjacent pels of a same video line is fed to a comparator which determines whether the current modulus is greater than the one assumed as the temporary maximum modulus value. If the comparator indicates that the current modulus is greater, it commands a multiplexer which stores in a dedicated register the temporary maximum value. This process is repeated for a number of times for the associated processing window, for example, for 16 times for a processing window (block) of 16 pels.

The current maximum temporary value feeds the common input node of an array of comparators, each of which is fed at its second input node with a certain threshold value. Clearly, the maximum difference value will belong only to a certain range as established by the array of comparators, and, therefore, only one of an array of output AND circuits, driven by the output of the respective comparators of the array will output a high logic level, while all the other AND circuits will output a logic low value. In this way, a bus of a certain number of bits (in the example 16) is generated. This feeds a simple combinatory logic circuit to produce four bits useful to command the multiplexer that will output the pertinent address. The address activates a ROM or PAL device which, in turn, loads the quantizer of the ADPCM recompression system with the selected set of coefficients of quantization. In this way, the compression of 16 pels of which the variance estimator has preliminarly estimated the relative power is performed.

According to an important aspect of the present invention, an improved architecture of the variance estimator is defined which permits selecting the most effective quantizer for ADPCM compressing the digital video data. According to a preferred embodiment of the invention, two look-up tables for the quantizer's coefficients may be conveniently used, one for the luma and the other for the chroma.

The recompression of the data by an ADPCM technique is strongly dependent on the method used for selecting the quantizer (that is the set of parameters of quantization), which is, in turn, used for quantizing the differences between adjacent pels. The technique of the present invention permits selecting the most suited set of coefficients for quantization with a greater precision compared to what was possible to do with the known systems.

BRIEF DESCRIPTION OF THE DRAWINGS

The essential aspects of the invention, its different embodiments and relative advantages will be more easily recognized through the following description of two different applications of the invention and by referring to the attached drawings, wherein.

Figure 3:
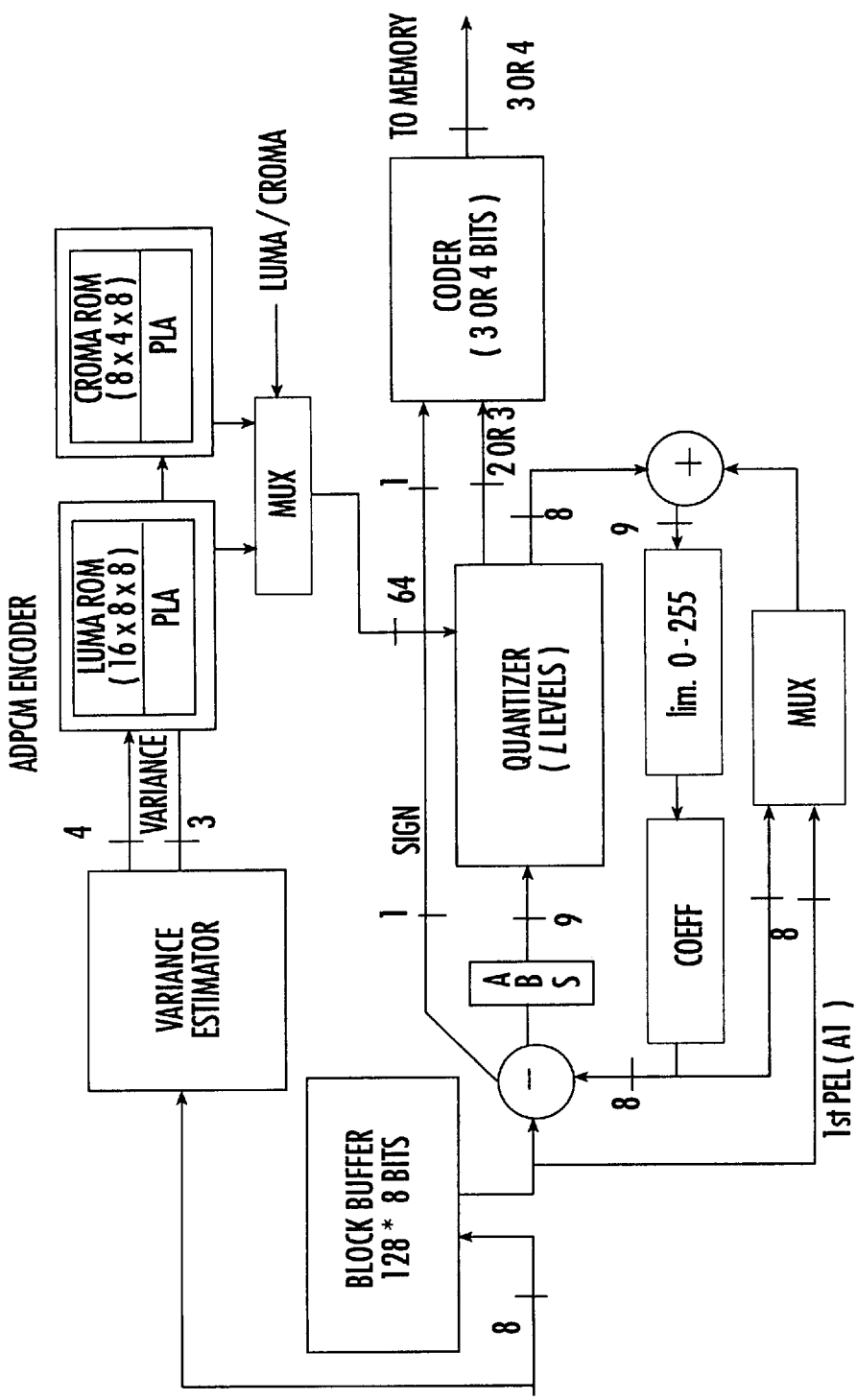
FIG. 3 is a block diagram of the ADPCM coder wherein the two distinct look-up tables of quantization coefficients for the luma and chroma are illustrated.
Figure 5:
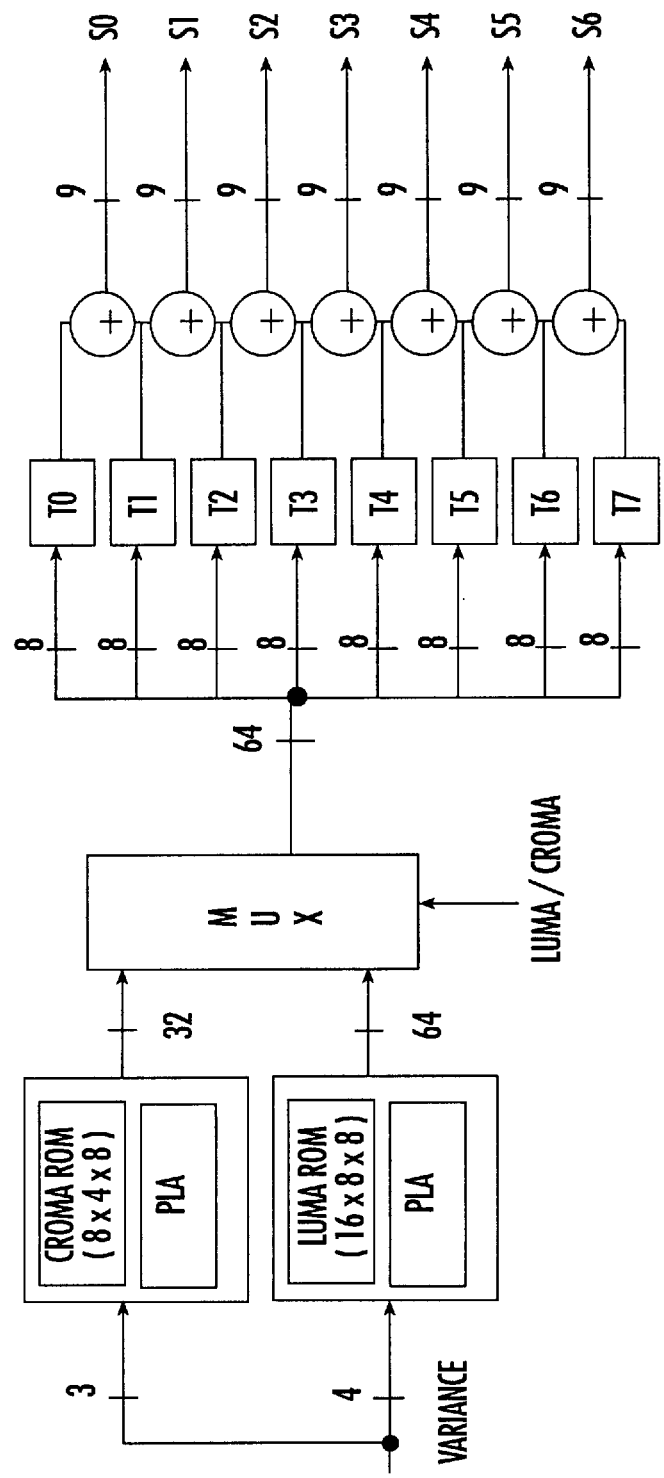
Figure 6:
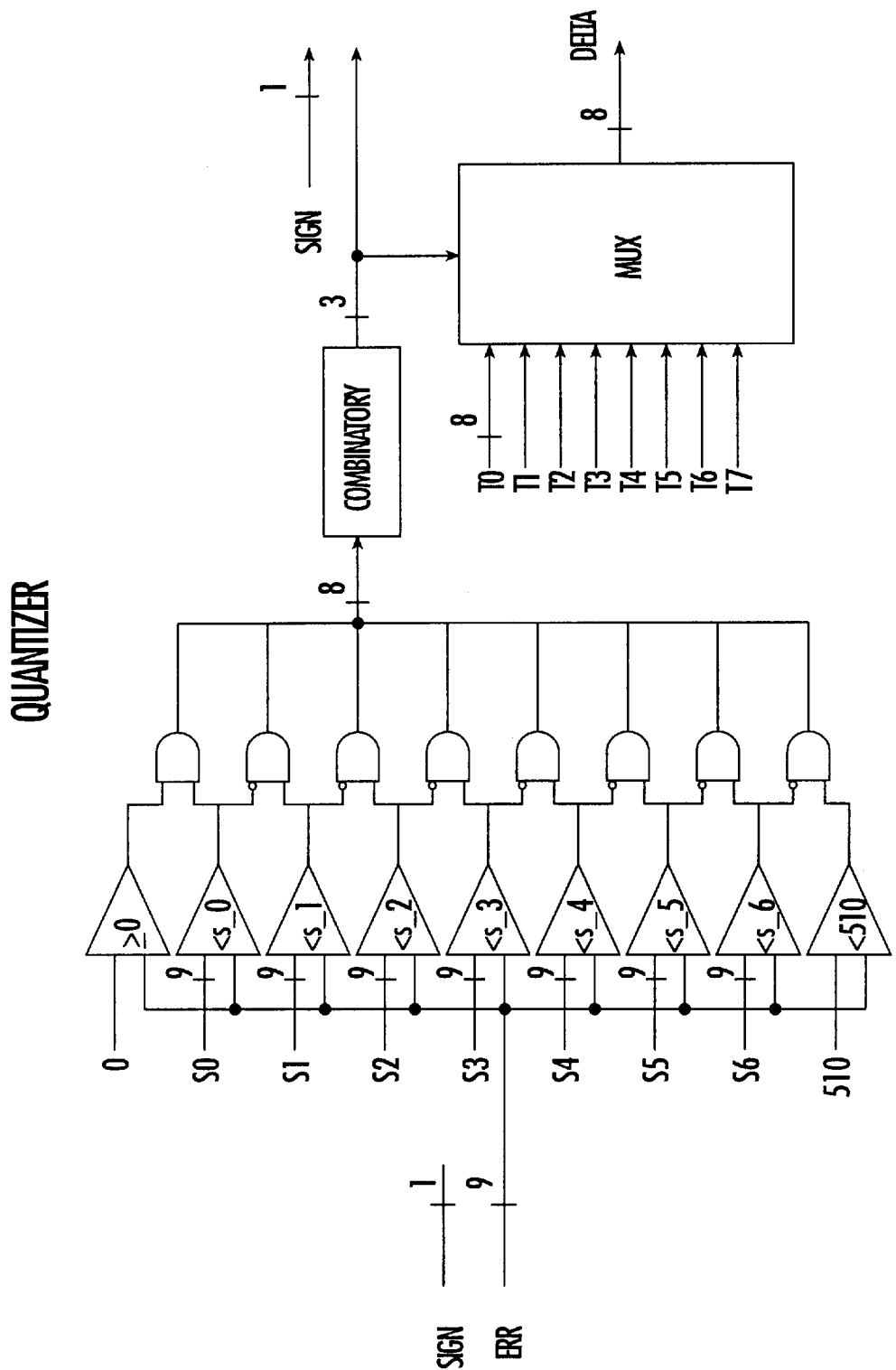

the FIGS. 5 and 6 show a possible architecture of the quantizer of the diagram of FIG. 3.

Figure 2:
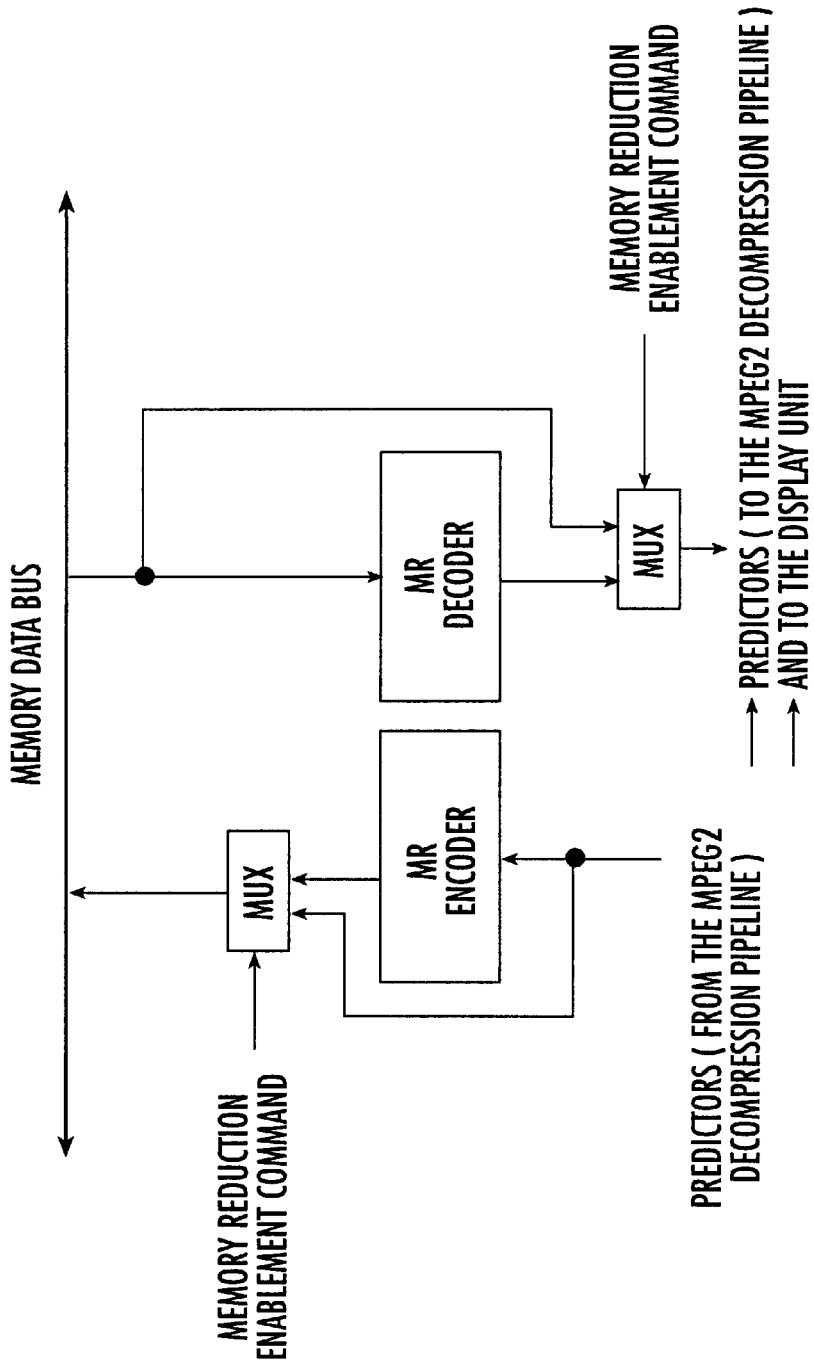
FIG. 2 shows a detail of the coding/decoding block and of the multiplexer for enabling or disabling the ADPCM recompression.
Figure 7:
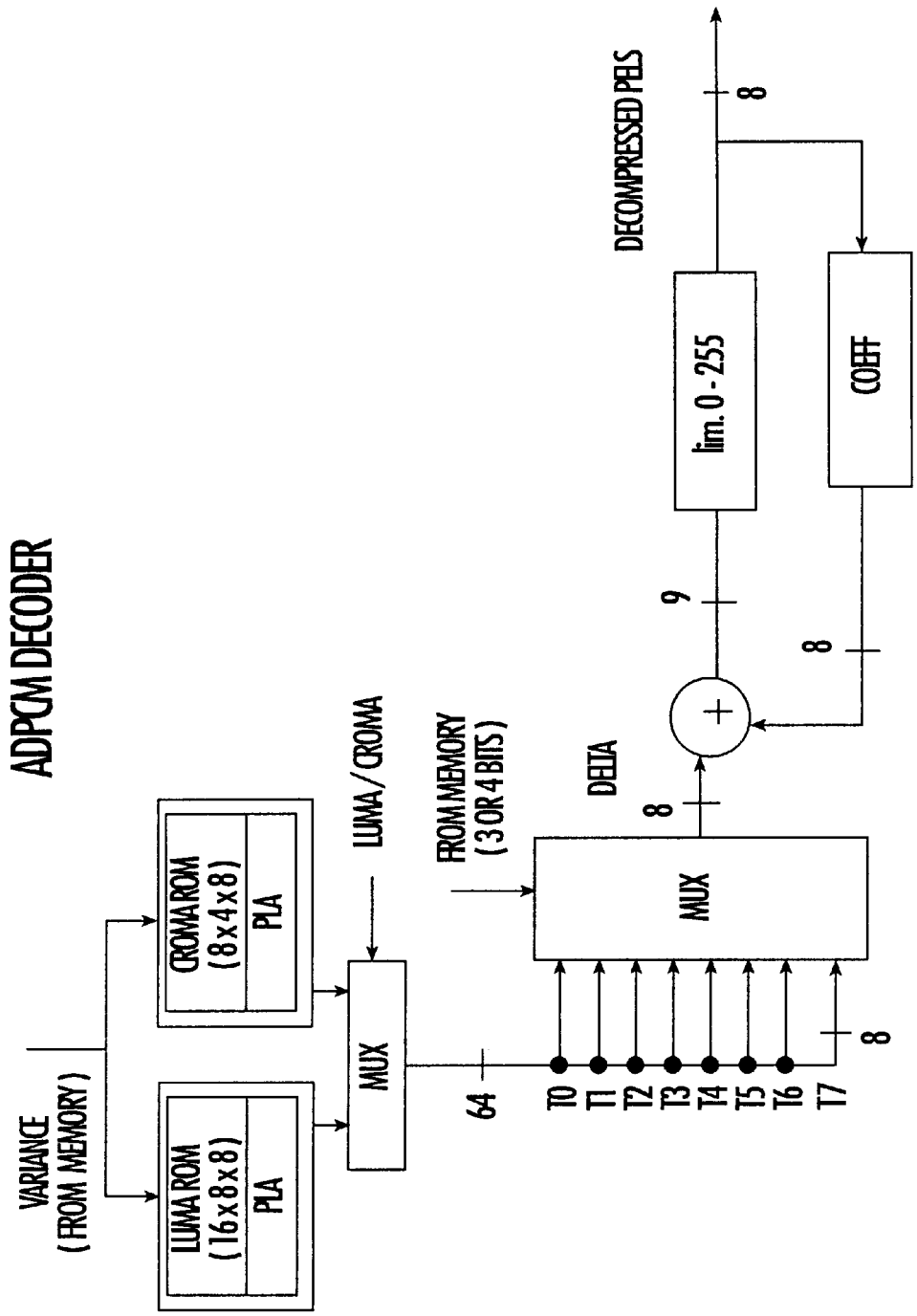
Figure 8:
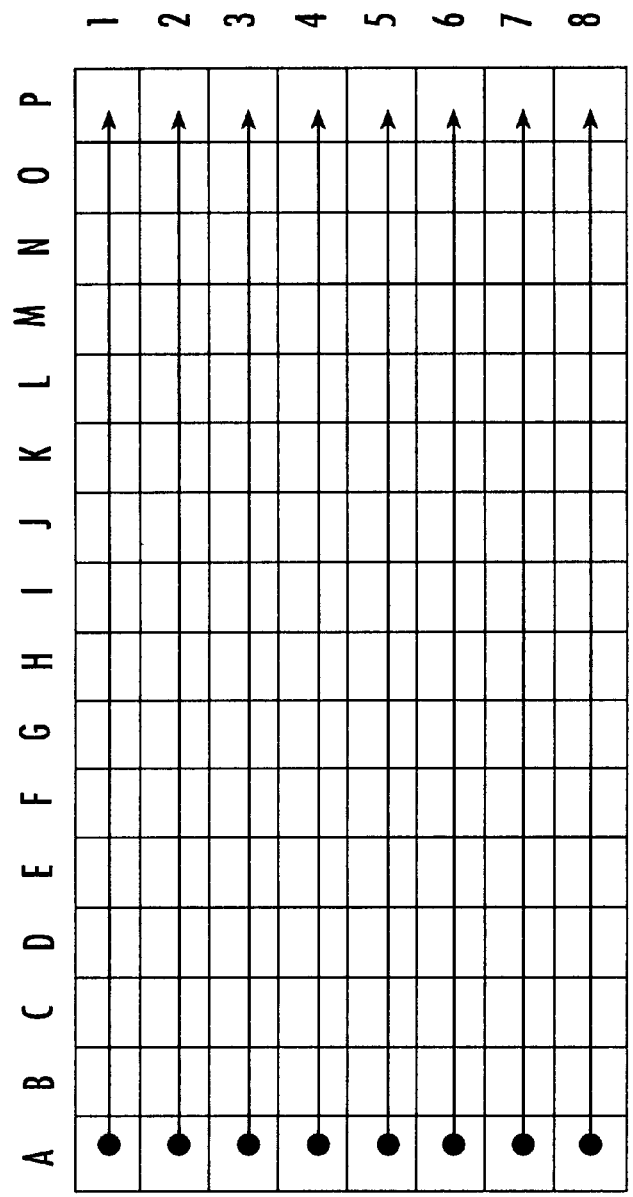
Figure 9:
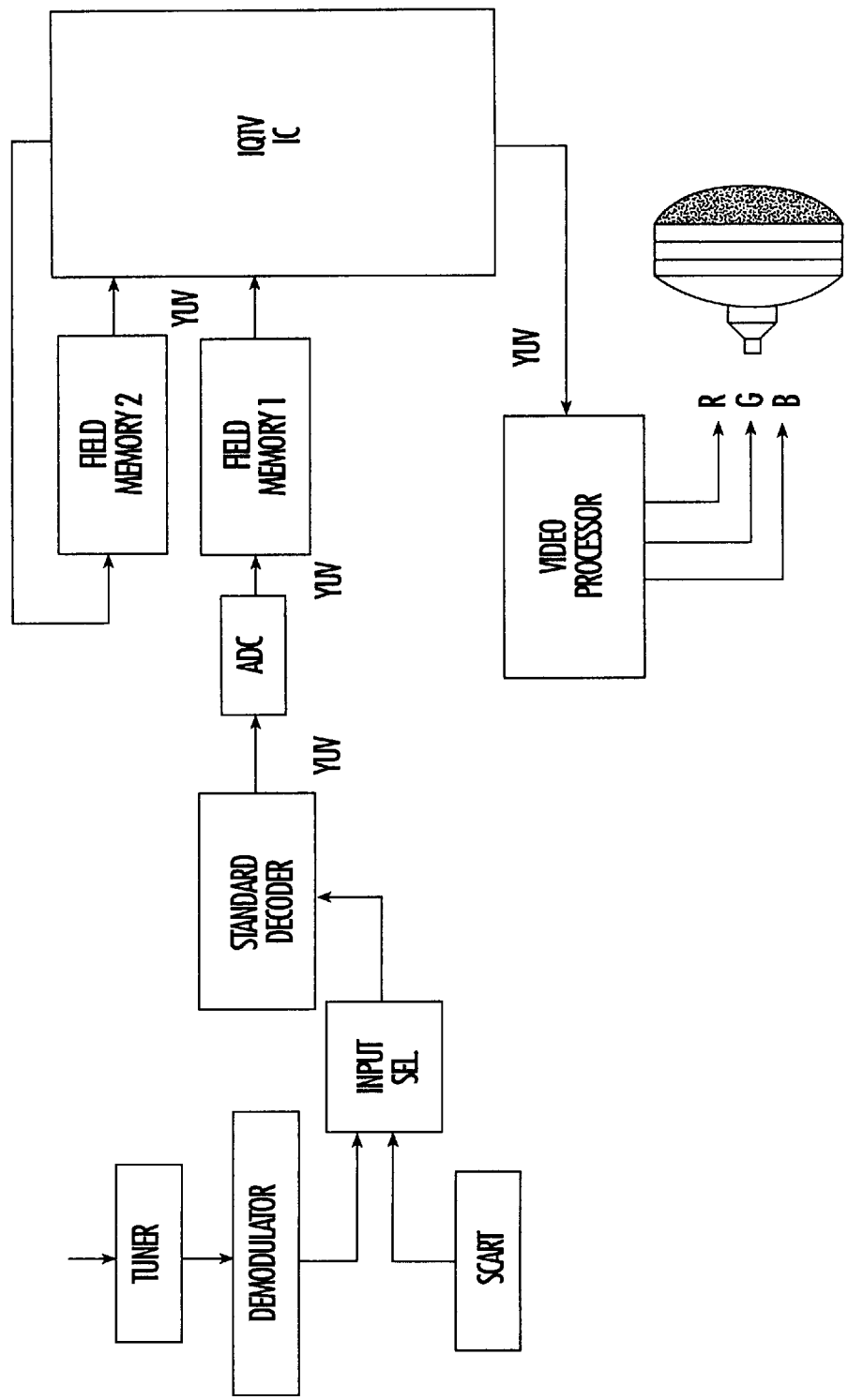
Figure 10:
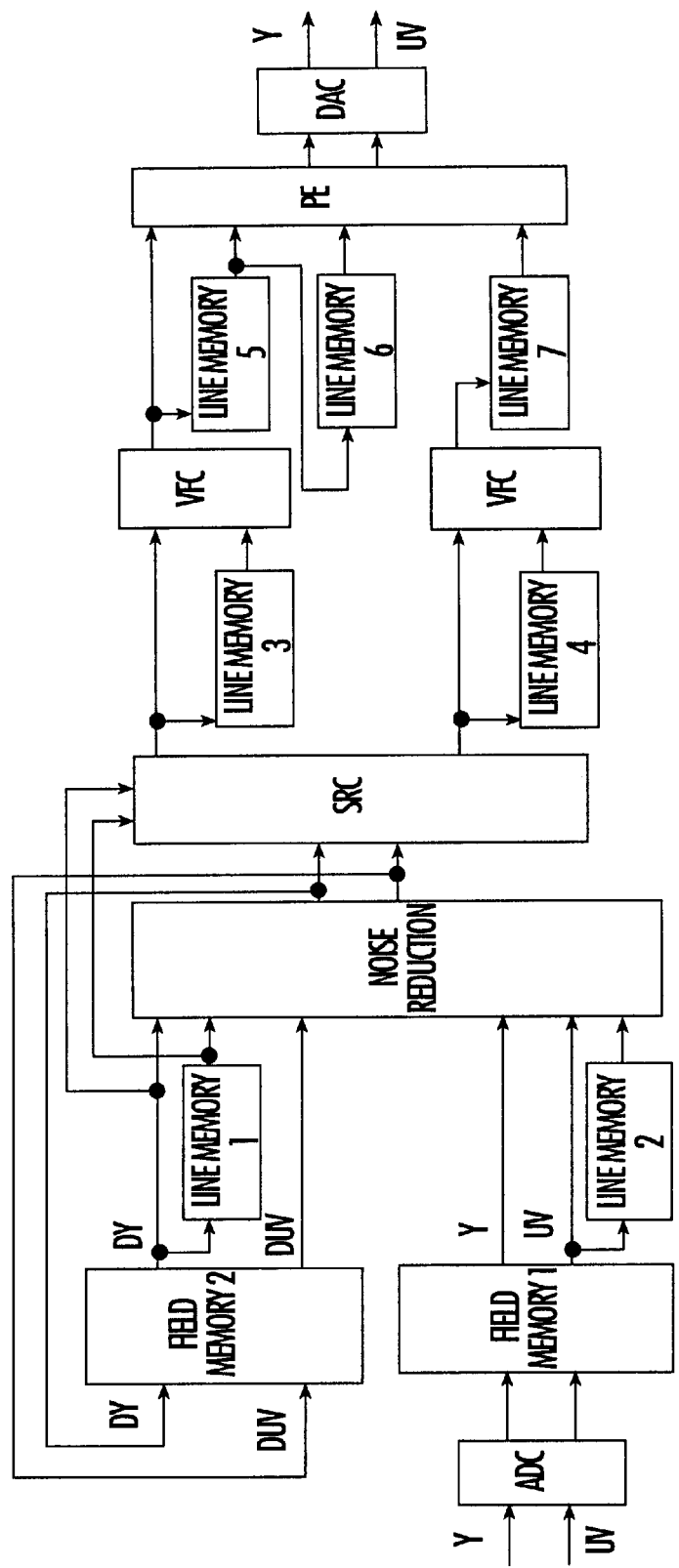
Figure 11:
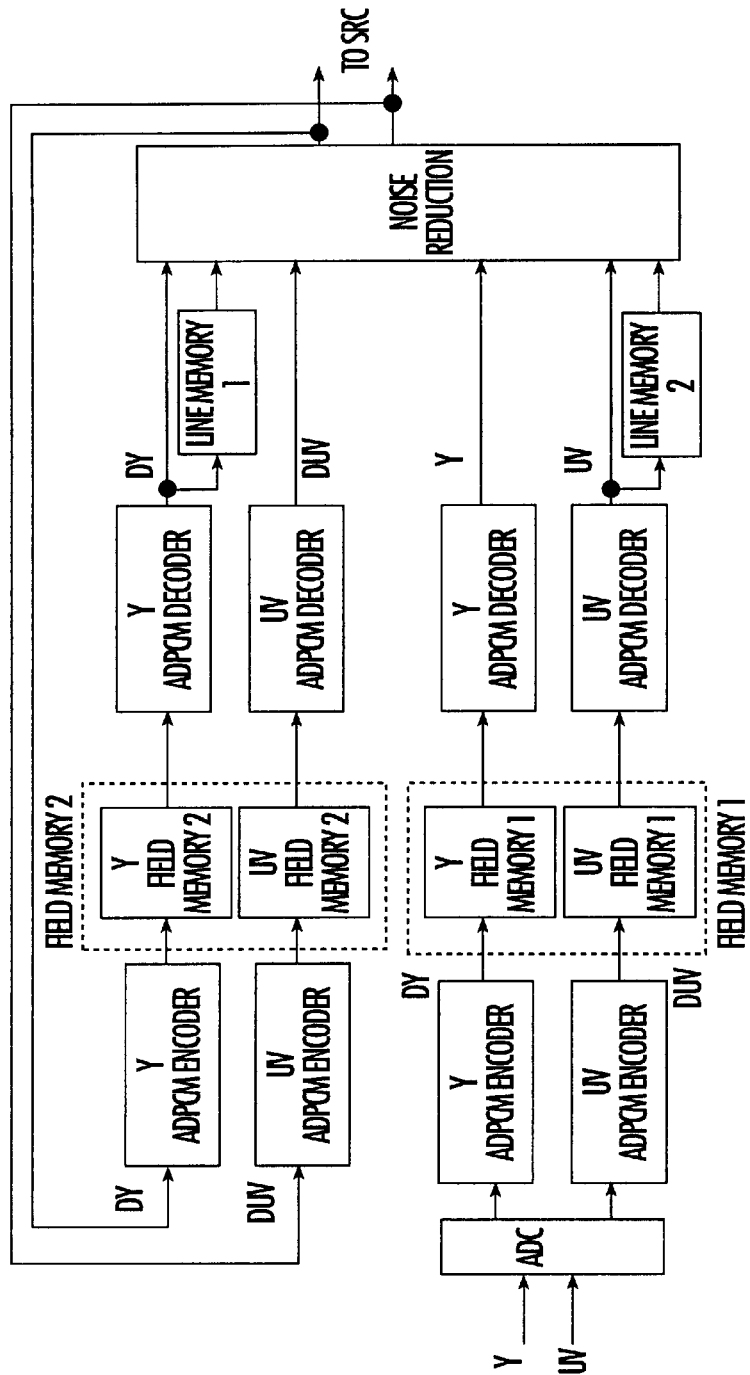
Figure 12:
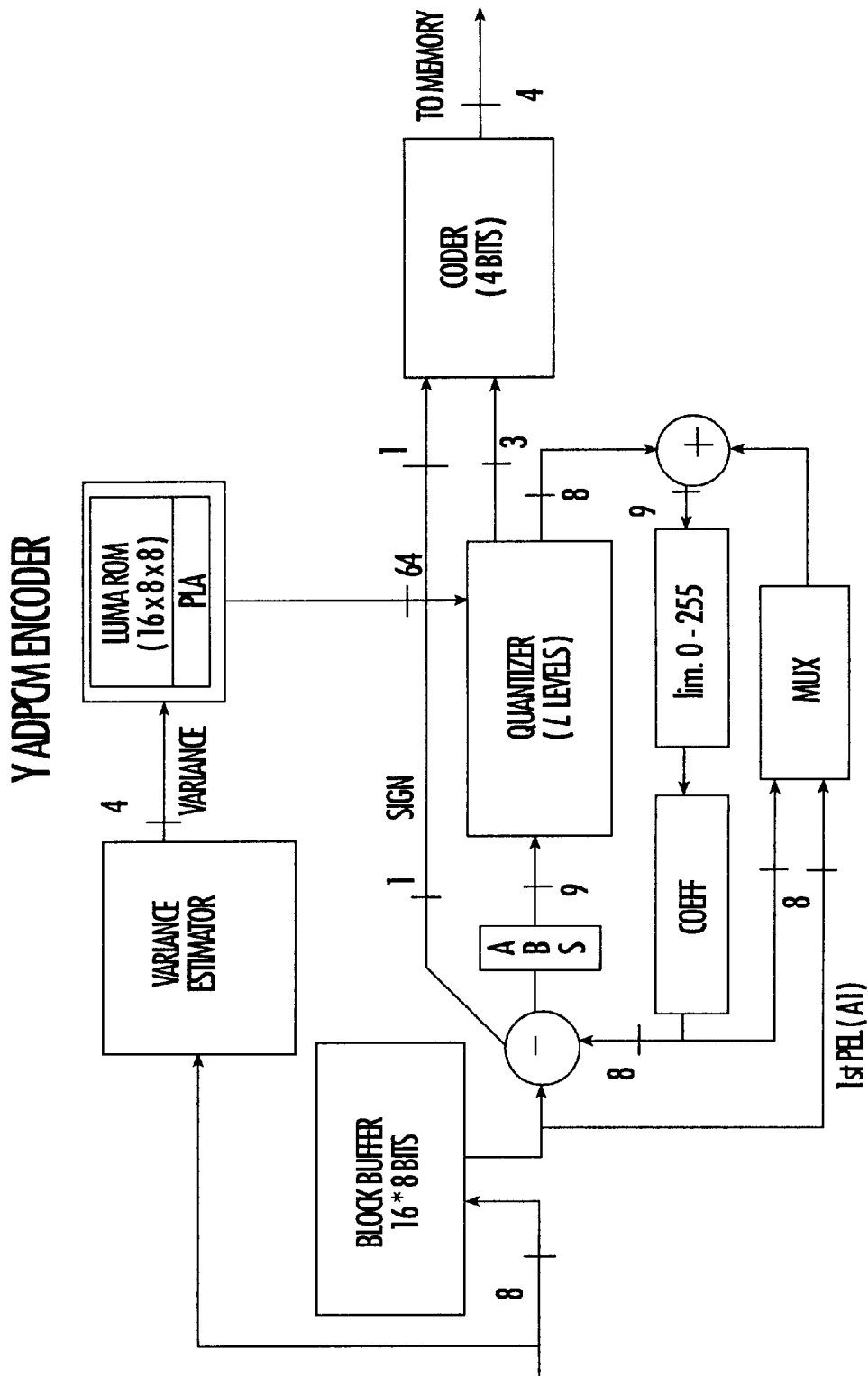
Figure 13:
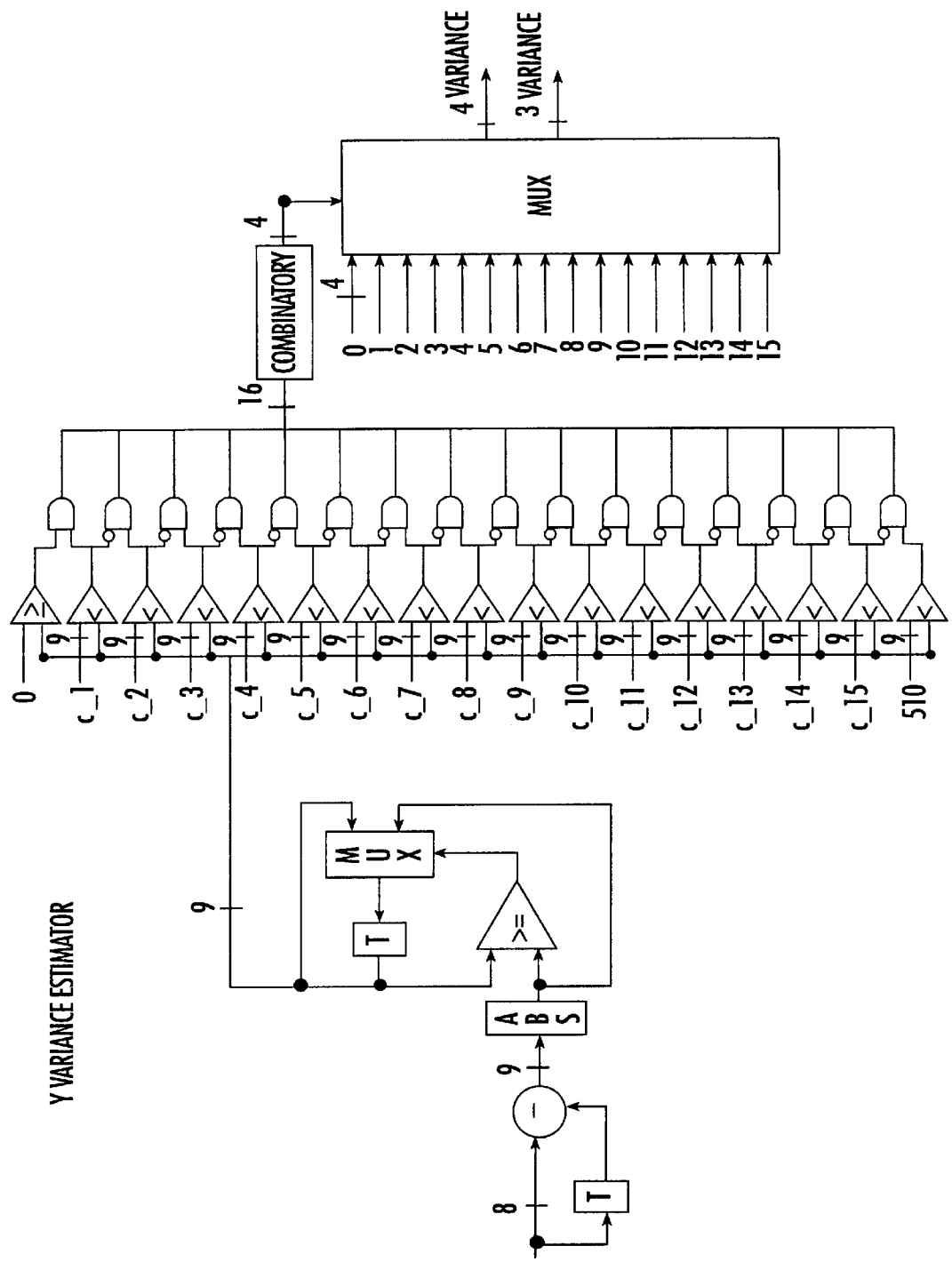
Figure 14:
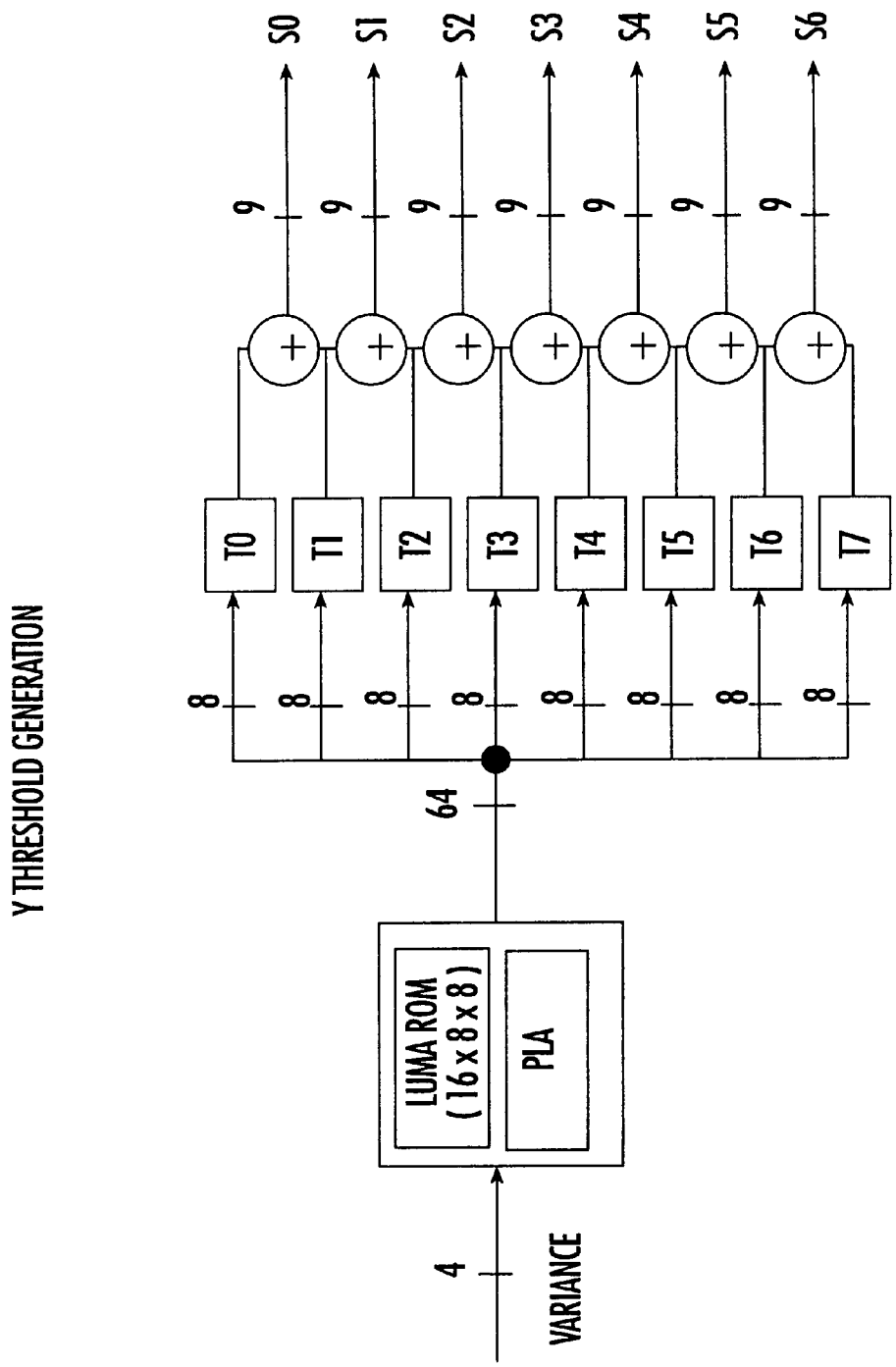
Figure 15:
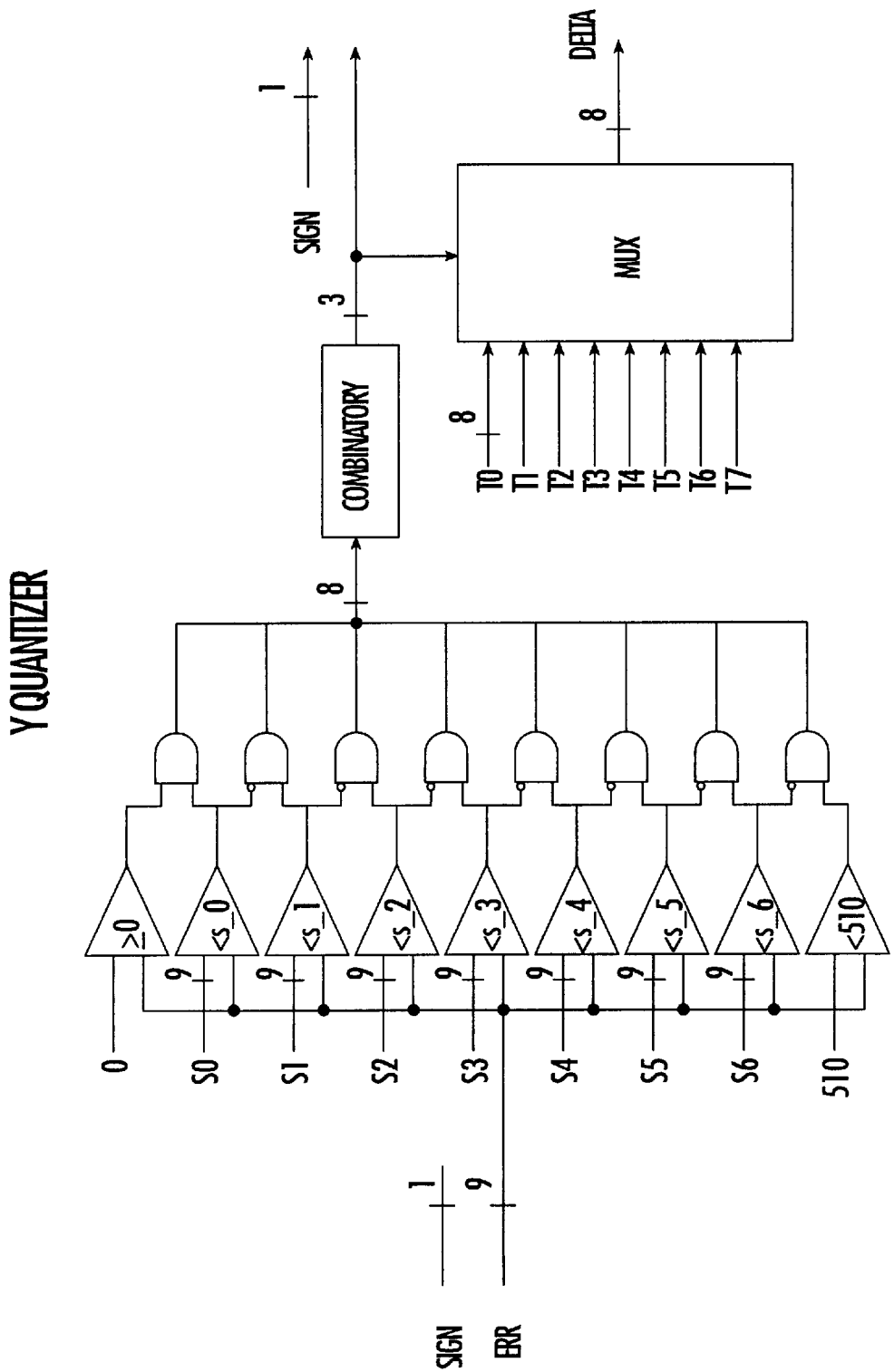
Figure 16:
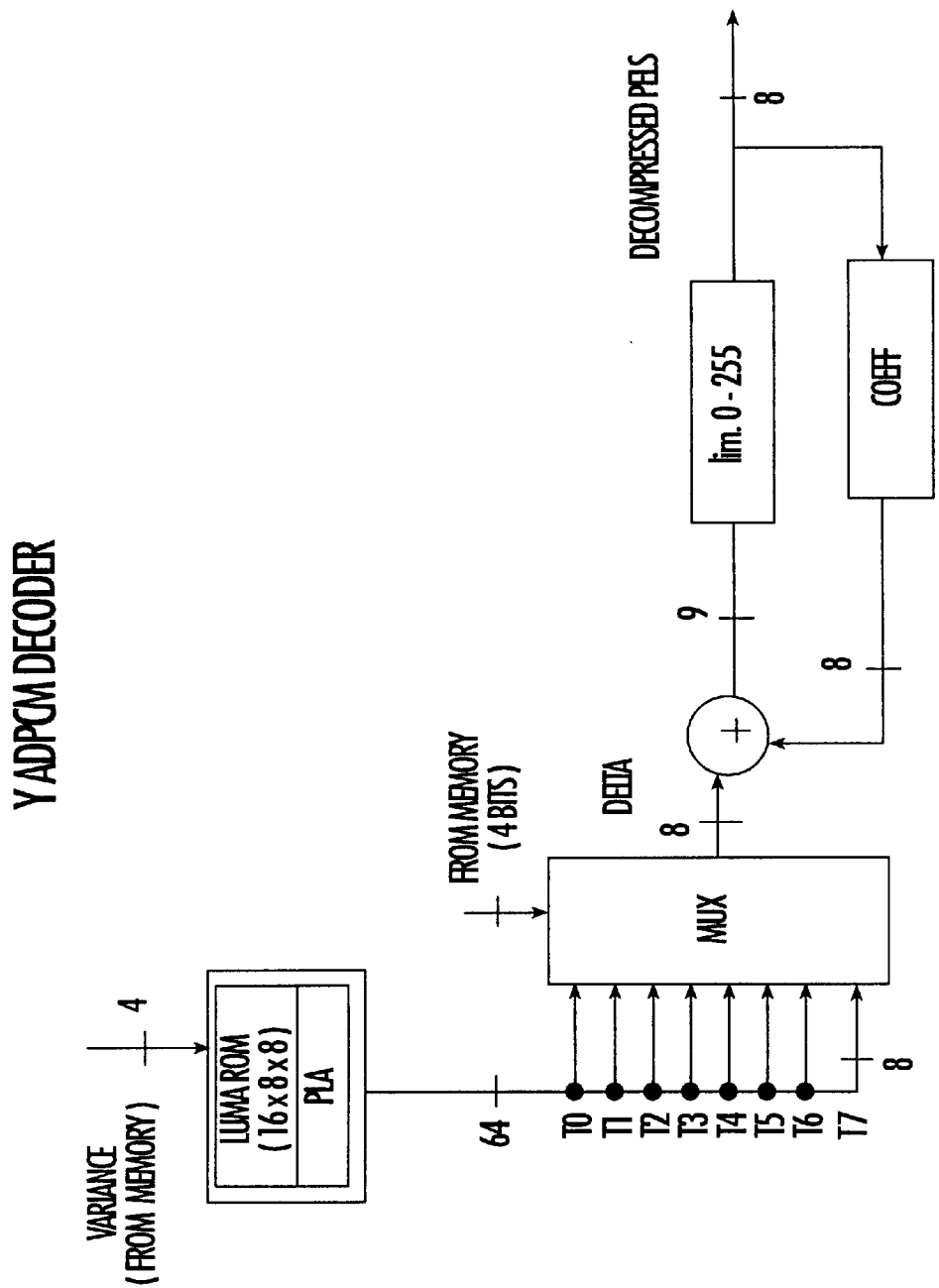
Figure 17:
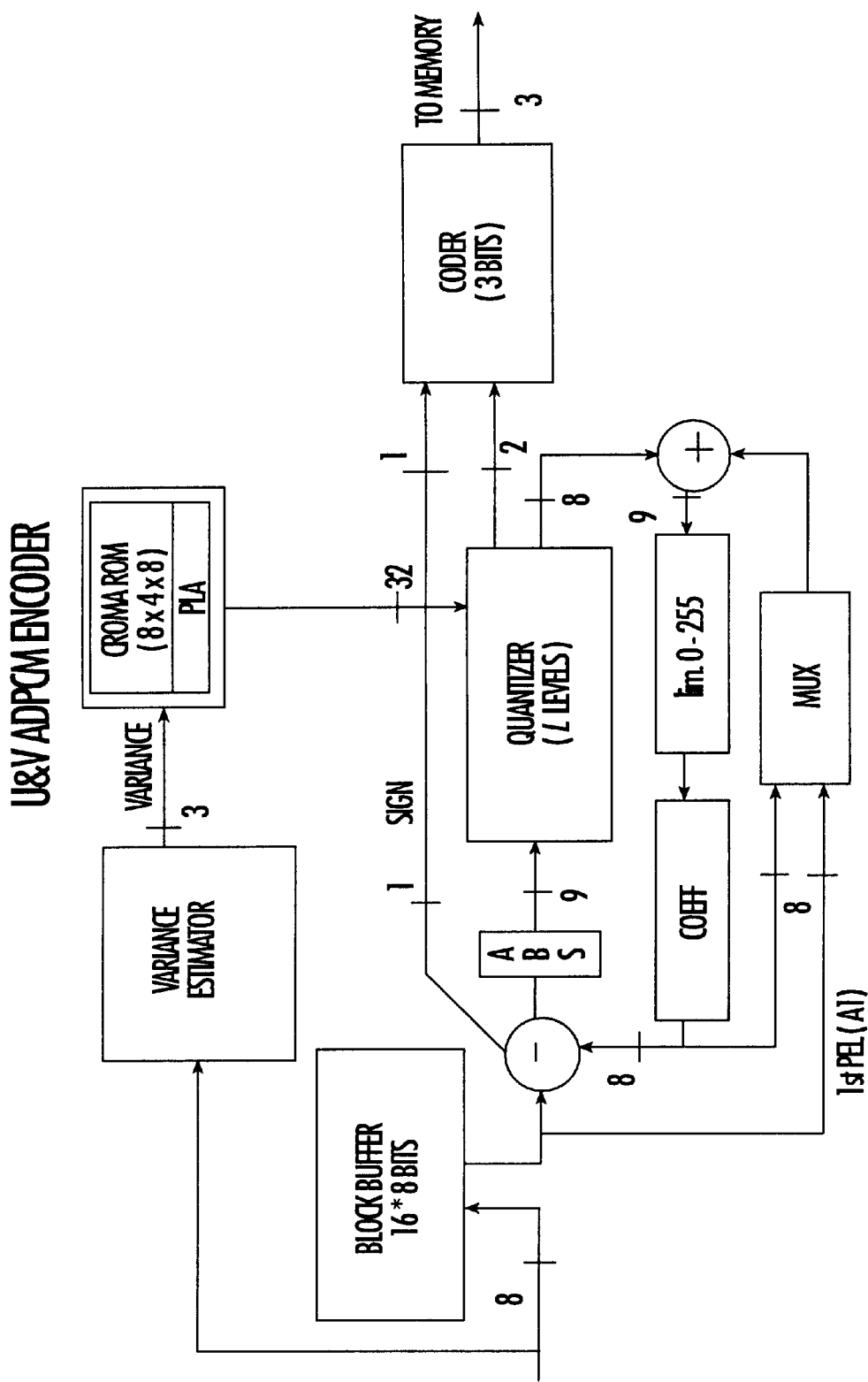
Figure 18:
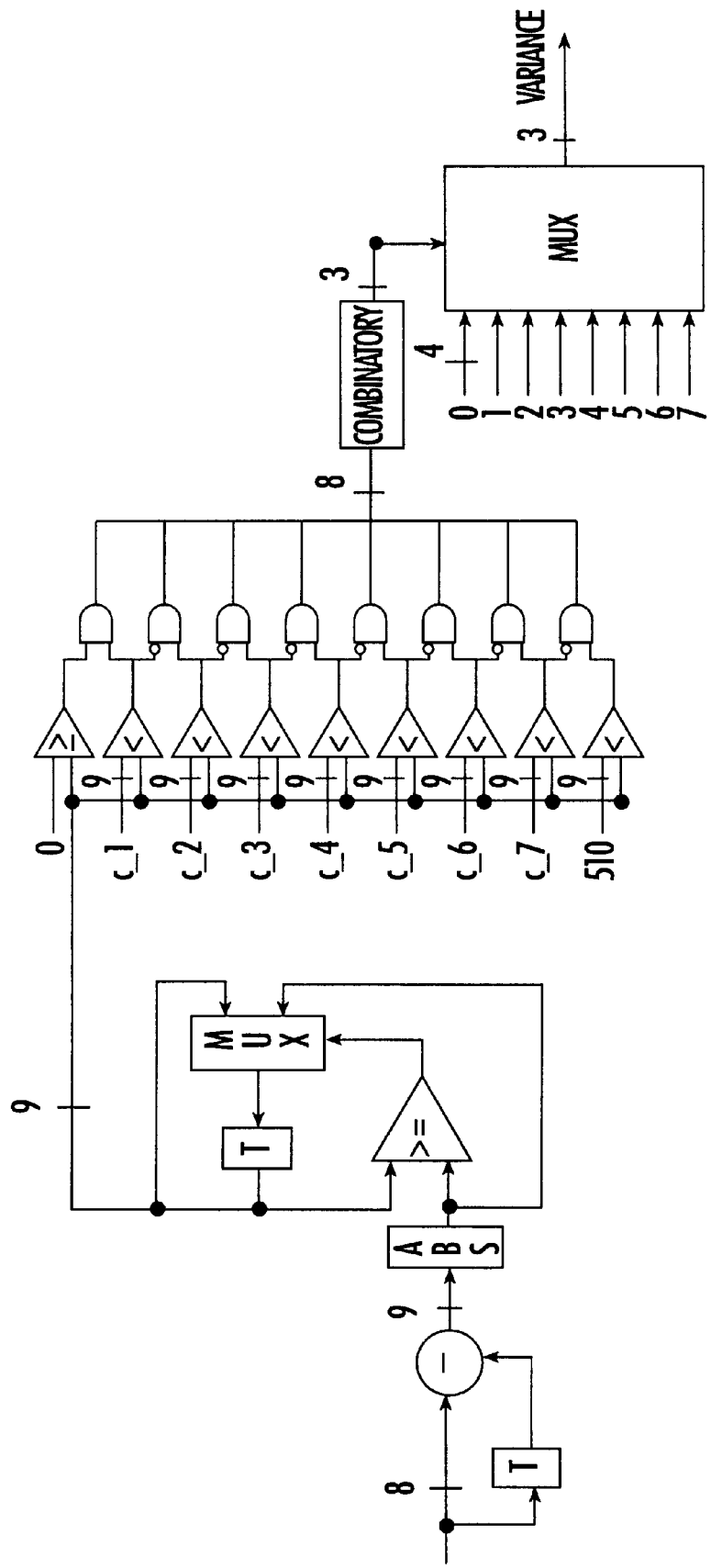
Figure 19:
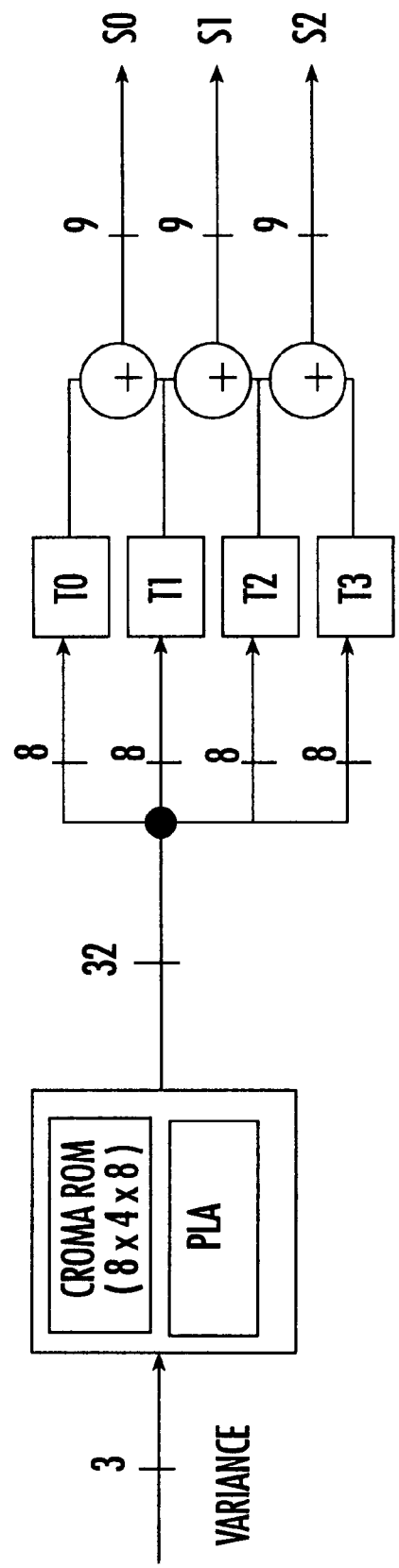
Figure 20:
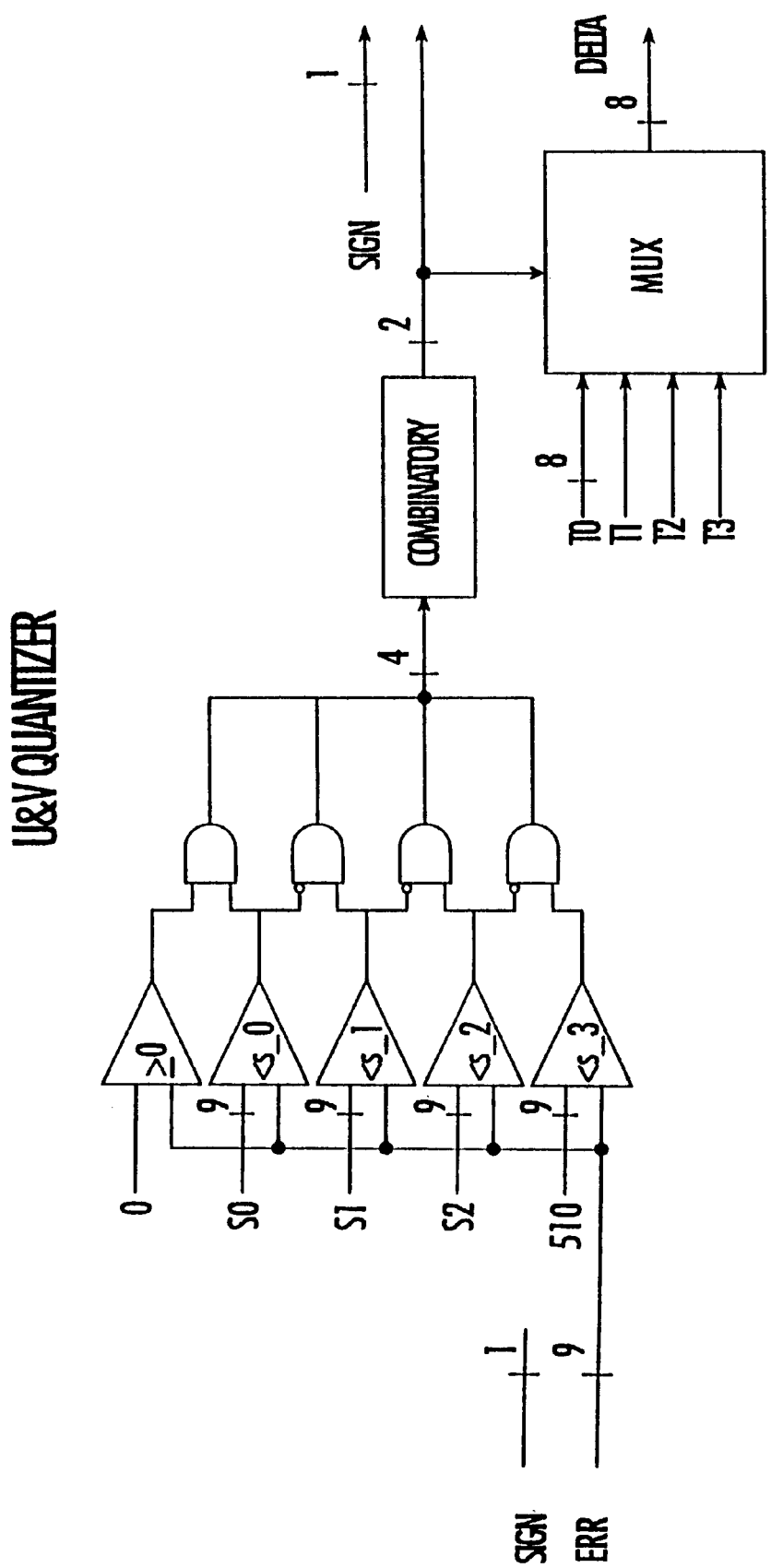
Figure 21:
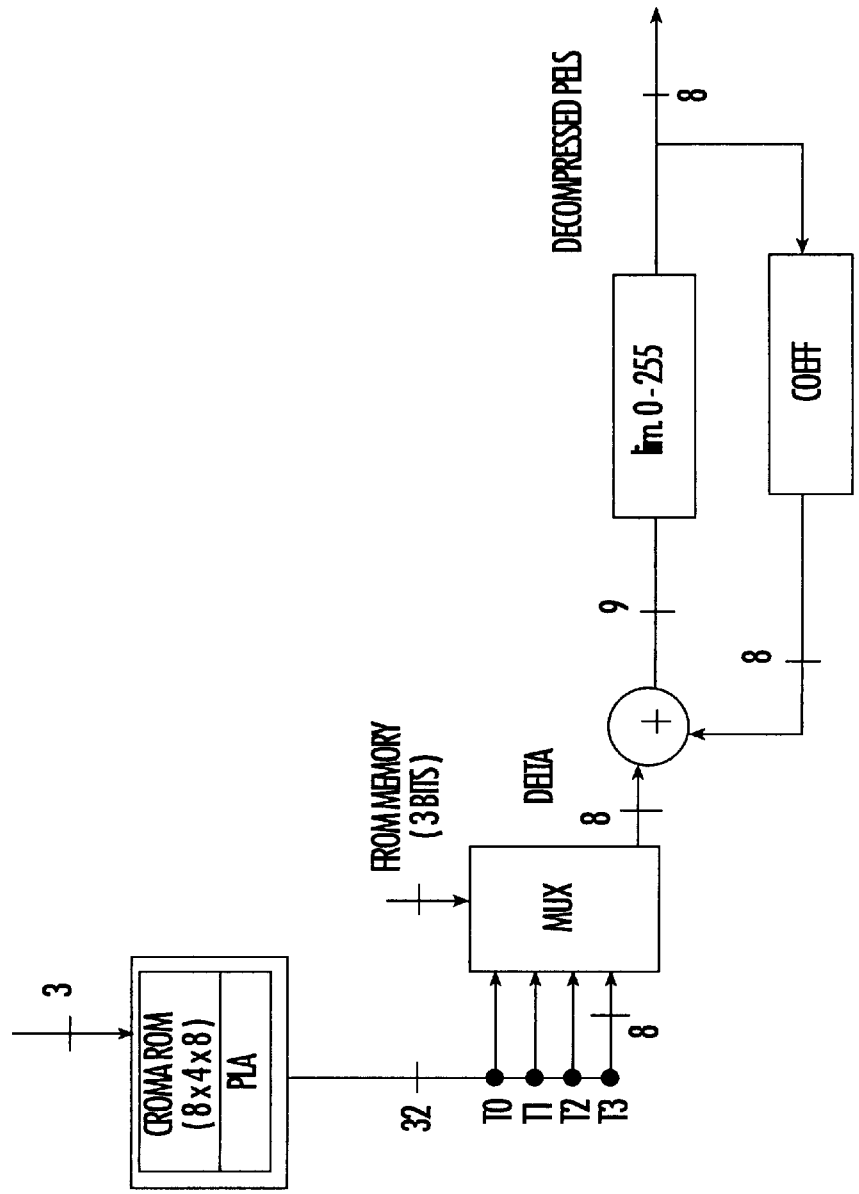
Figure 22:
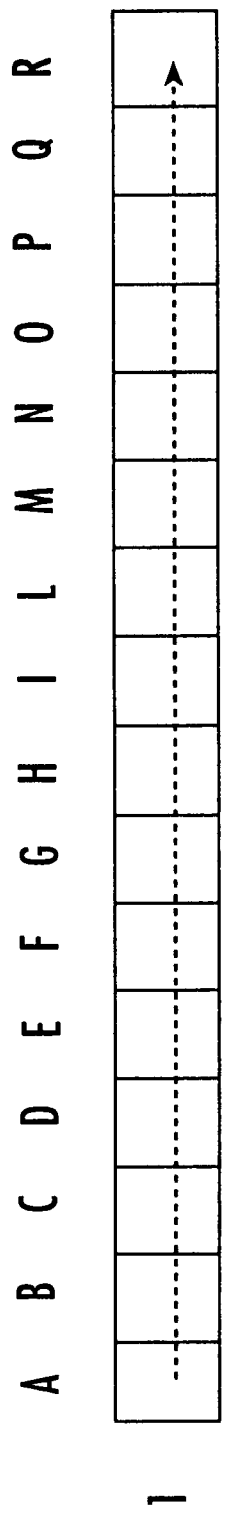
Figure 23:
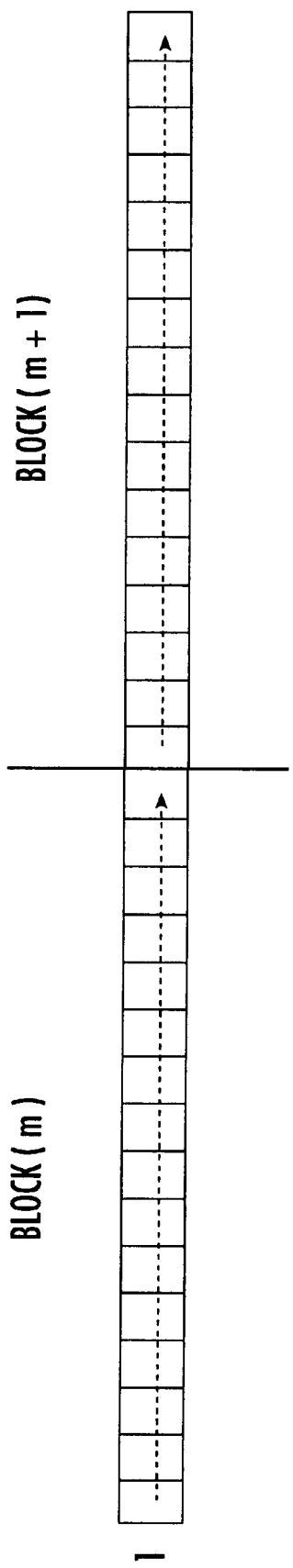

FIG. 7 shows the architecture of the ADPCM coder of the diagram of FIG. 2;

FIG. 8 shows a 16*8 luminance block output from the I-DCT pipeline and after motion compensation, divided in 8 horizontal lines, each of 16 pels;

FIG. 9 shows a block diagram of high level of a video receiver including an IQTV_IC processor;

FIG. 10 is a high level block diagram of the IQTV_IC device of the diagram of FIG. 9;

FIG. 11 is a block diagram that enlightens the Y and U & V ADPCM compression blocks and the relative decompression blocks;

FIG. 12 is a block diagram of the ADPCM coder that compresses the luminance component;

FIG. 13 is a block diagram of the variance estimator internal to the Y ADPCM coder of FIG. 12;

FIG. 14 is a diagram of the read device from the ROM of the quantization coefficients and of the blocks for generating the discrimination thresholds used by the quantizer of FIG. 15 for the luminance component;

FIG. 15 is a block diagram of the quantizer of the diagram of FIG. 12;

FIG. 16 is a block diagram of the ADPCM coder that compresses the luminance component;

FIG. 17 is a block diagram of the ADPCM coder that compresses the luminance components;

FIG. 18 is a block diagram of the variance estimator internal to the diagram of FIG. 17;

FIG. 19 is a diagram of the read device from the ROM of the quantization coefficients and of the blocks for generating the discrimination thresholds, used by the quantizer of FIG. 20, for the chrominance component;

FIG. 20 is a block diagram of the quantizer of the diagram of FIG. 17;

FIG. 21 is a block diagram of the ADPCM coder that compresses the chrominance components;

FIG. 22 shows the processing window of which the ADPCM recompression of the luminance component as well as of the chrominance components is performed; and FIG. 23 shows an example of decompression of two previously compressed windows for regeneration of the "raster" format at the output of the "field memories".

ADPCM RECOMPRESSION

Let I be a digital picture represented by a matrix of M rows and N columns of pixels, and let I(x, y) be the pixel defined by the row y and the column x, defined as an integer number by a number B of bits (binary figures). Let picture I be subdivided in rectangular blocks having an 1*C size (one row and C columns). The maximum efficiency for the compression is obtained when C is chosen among the integer dividers of N.

The algorithm carries out a compression of each block, that is, a reduction of the number of bits necessary for the representing of the block itself and exploiting just the data extracted from the block itself. This is done with the aim of simplifying the access to the block in the stream of compressed data and also the decompression of the block itself.

Considering, for example, an arrangement for the scanning of the pixels of each block according to a scanning scheme such that for each pixel with the exception of the first, there exists another, preceding it, which may be used as the predictor of the pixel itself. Let $P(i, j)=$, $i=1, \ldots, C$ be the pixel defined by the row i and the column j of whichever block, and let $P'(i, j)$, be the pixel used as predictor of $P(i, j)$ then the arrangement is defined as follows:

* P(1, 1) first pixel of the scanning
* P'(i, 1) P(i–1, 1); i=2, . . . , R
* P'(i, j) P(i, j –1); i=1, . . . , R and j=2, . . . , C Let E(i, j)=P(i, j)–P'(i, j) be the prediction error. It is known that the whole of the prediction errors has a statistic representation that can be well approximated to a sequence of independent random variables and identically distributed and having a Laplacian probability density. By exploiting this knowledge ahead of the prediction error, it is possible to compress the latter by mapping it on a small group of values Q(k), k=1, . . . L and L<$2s^B$ without introducing an excessive distortion. This mapping operation is commonly named "quantization". Supposing that each of the L values Q(k) can be coded with a number of bits C less than B (always true when for example L=<$2^c$) the binary coding of each pixel subjected to the predictive process is compressed by a factor C/B.

The ADPCM compression method is applied to each block into which the picture is decomposed through the following operations:
1) Selecting and coding an appropriate quantizer in the digital stream.
2) Coding of the first pixel of the block.
3) Decorrelating, quantizing and coding of all the remaining pixels of the block.

The various steps and the circuit architecture that carry out these operations are hereinbelow singularly described for the case of an implementation of the present invention to a MPEG decoder.

Figure 1:
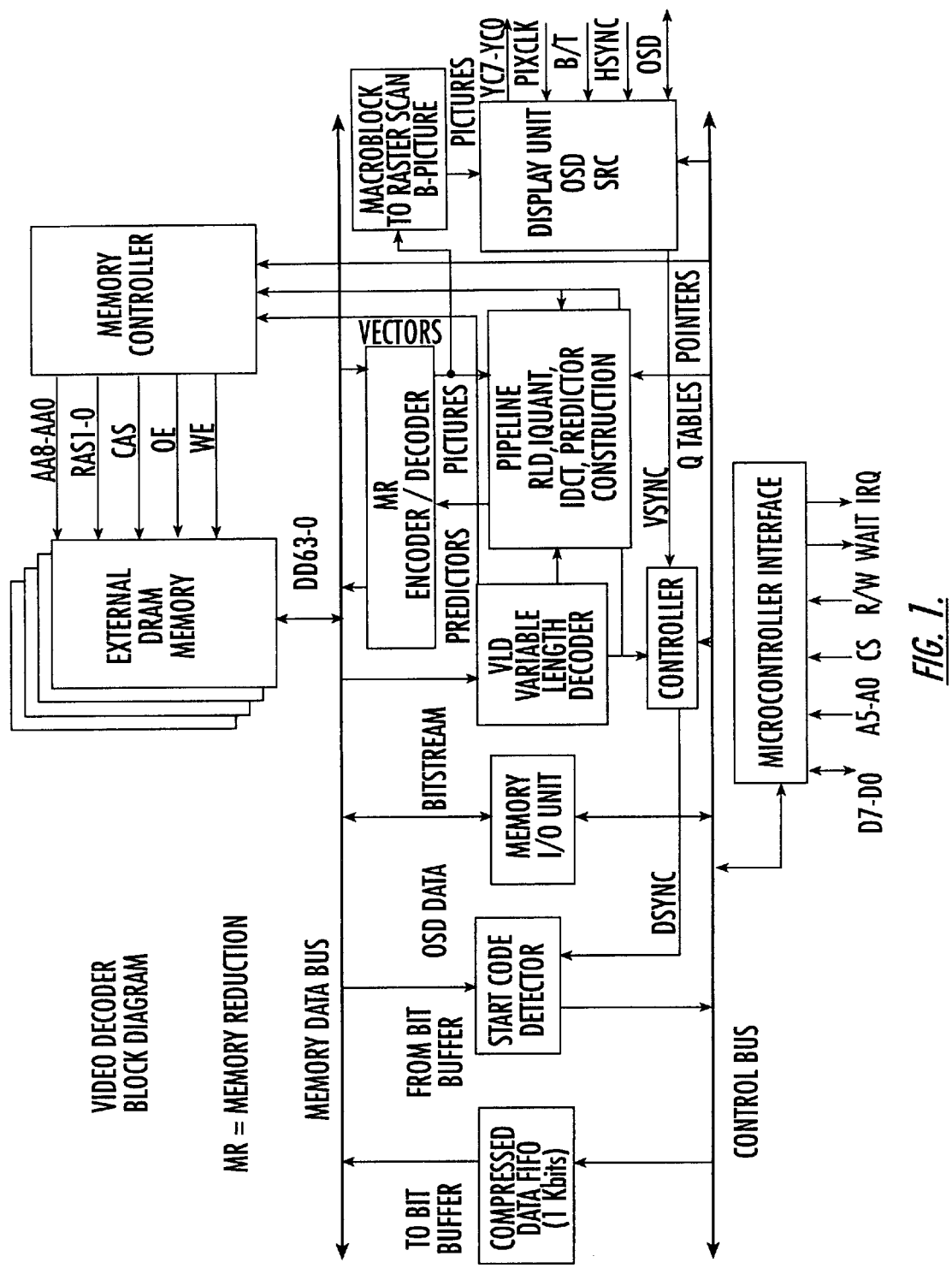
FIG. 1 is a block diagram of the "core" of an MPEG2 video decoder, made according to the present invention.

According to the architecture shown in FIG. 1, the MPEG-2 video decoder ("video core") accesses an external DRAM memory through an interfacing memory data bus which can be shared by an MPEG audio decoder for accessing a respective audio buffer that may be organized in the same external DRAM. Besides interfacing with the memory data bus, the video decoder also interfaces with a Control Bus through which a system's control microprocessor intervenes through the interfacing block (Microcontroller Interface). The video decoder may also include a controller (CONTROLLER) for the management of the synchronisms (DSYNC) and (VSYNC).

According to a conventional MPEG-2 architecture, the decoder comprises: a "first-in-first-out" buffer (Compressed Data FIFO), for instance with a capacity of 1 Kbits for the acquisition and the writing of compressed data in a first buffer (Bit buffer) of the external DRAM; a Start Code Detector, a memory bidirectional buffer (Memory I/O Unit) for On Screen Display (OSD); and a first variable length decoder (VLD) block for the compressed input data stream (BitStream). The MPEG-2 decompression of DCT data is carried out by the relative decompression block Pipeline-RLD, I_QUANT, I_DCT, Predictor Construction. The pipeline typically includes a "run-length" decoding stage (RLD), an inverse quantization circuit (I_QUANT), an inverse discrete cosine transform processor (I_DCT) and a network for the generation or construction of a predictor value (Predictor Construction).

In a known architecture, the blocks of I_DCT data output by the I_DCT processing circuit that calculates the inverse discrete cosine transform and the motion compensation relative to the I, P and B pictures, were written in the respective buffers of the external memory in a coded form, that is, as words of a certain number of bits before being decoded and sent to the Display Unit. By contrast, according to the above cited prior patent application, the decompressed I_DCT data relative to the I and P pictures may be subsampled or not before being ADPCM recompressed and thereafter coded and written in the respective buffer of the external memory by means of a block referred to as a whole in FIG. 1 as MR Encoder/Decoder. The recompressed data read from the DRAM are then decoded, decompressed and eventually upsampled to be sent, together with decompressed B-pictures, to the display unit.

In the preferred case of a "direct" reconstruction of the B-pictures this is then realized as follows. The ADPCM compressed I and P predictors are read from the external DRAM memory and ADPCM decompressed to perform motion compensation of the B-picture that is currently being MPEG decompressed by the "pipeline", and subjected to a median subsampling procedure. The macroblocks of I-DCT data so reconstructed are sent to the conversion circuit "MACROBLOCK TO RASTER SCAN" upstream of the display Unit of the diagram shown in FIG. 1 and they are then displayed. This procedure does not require any buffer in the external memory destined to store the B-picture because such a buffer is present in the macrocell "MACROBLOCK TO RASTER SCAN CONVERTER B-PICTURE".

In line with an important aspect of the system of this invention characterized by its adaptability to changing conditions of video memory availability (for example by supposing of having available a 16 Mbit external memory), the system is perfectly able to deactivate the algorithm that reduces the memory requisite through ADPCM recompression, coding and eventual writing in the video memory or otherwise to activate it. This operation is implemented by controlling two multiplexers through the microprocessor.

The enabling/disabling scheme of the function that reduces the memory requisite in an adaptive manner through the controlling microprocessor is illustrated in FIG. 2. In this partial view are shown in detail the two multiplexers controlled by the microprocessor that perform the activation or deactivation of the ADPCM recompression system through the MR Encoder and MR Decoder blocks. By referring to FIG. 3, the ADPCM encoder block comprises a 128*8 bit input buffer (BLOCK BUFFER) for the acquisition of the I_DCT input data.

A dedicated circuit (VARIANCE ESTIMATOR) which is realized in accordance with the present invention calculates the average pels value of each block of the I_DCT input data and the average of the sum of the absolute values of the differences between each pel of the I_DCT data block. With such parameters it is possible to estimate the variance of the input data (pels) block. A detailed functional scheme of the block that estimates the variance according to a preferred embodiment is depicted in FIG. 4.

Figure 4:
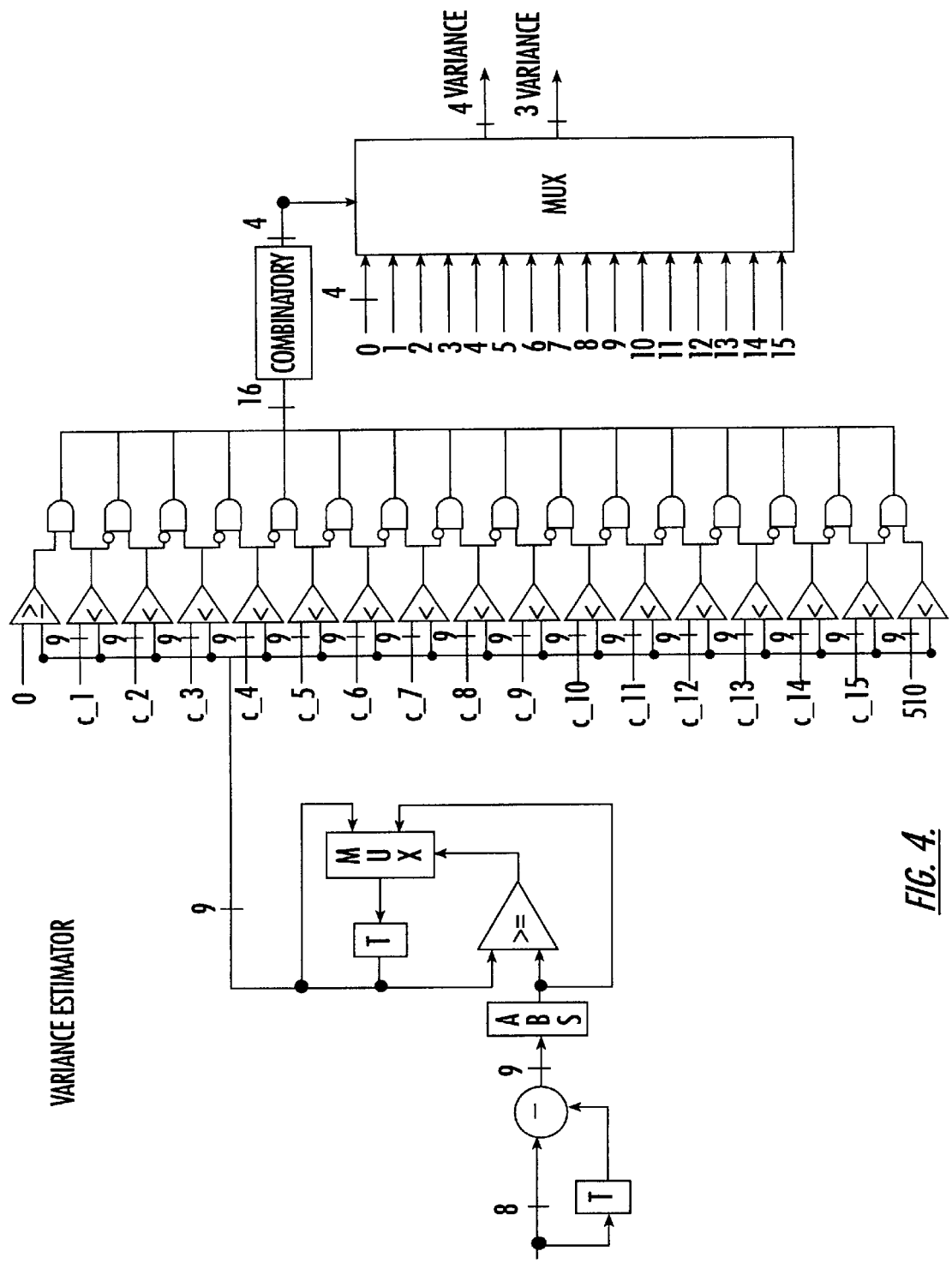
FIG. 4 shows the architecture of the variance estimator made according to the present invention.

The architecture shown in FIG. 4 represents an hardware equivalent of the monodimensional block compression algorithm of video data described above. The following description is made by following the scheme from left to right.

Each input pel is delayed by a primary clock period by means of the associated flip-flop T. By considering an 8-bit coding for each pel, an array of eight flip-flops T, in a parallel configuration, will be used. This permits simultaneously feeding, and with two adjacent pels, the subtractor block (–) which, in turn, feeds the ABS block that calculates the absolute value of the difference produced by the subtractor circuit (–). The ABS block outputs the value of the modulus of the difference between two adjacent pels. This value feeds a comparator ($\geq$) which determines whether the current modulus value is greater than the one assumed as the temporary maximum value.

If the comparator ($\geq$) indicates that the current modulus is greater, it commands the multiplexer MUX to store in the dedicated register T the new temporary maximum value. This process is repeated 16 times for the case of a processing window composed of 16 adjacent pels of a same video line.

The maximum value thus determined at the end of the process is fed to the common input node of an array of comparators ($\geq$). In the example considered 16 comparators are used, though their number may also be greater or smaller than 16. Each comparator is fed through its second input with a respective threshold value.

The maximum value of the differences between adjacent pels of the processing window will belong to only one of the 16 ranges. If, for example, it belongs to the range 0-C_1, the relative AND output gate will output a high logic value ("1") while all the other AND gates will output a low logic value ("0").

A 16 bit bus is so generated that feeds a simple combinatory logic circuit (COMBINATORY) which generates, for the case of an input bus of 16 lines, four output bits used to command the output multiplexer MUX which, in turn, will transmit the address "0" in the above case. This address operates the ROM (or PAL) containing the look-up table for the luma of the scheme of FIG. 3, so that the respective set of precalculated coefficients of quantization are loaded in the quantizer of the diagram of FIG. 5.

The first pixel of the block, previously identified as P(1, 1) is not subjected to any prediction and therefore is coded according to its original resolution by 8 bits. For each other pixel P of each block being processed, a predictor pixel P' will be adopted according to that described above. In general, such a predictor pixel by following the order of scan described above, has already been quantized and reconstructed and is not taken from the original picture. This permits a better control of the quality of the images consistent with the ADPCM compression technique employed to reduce the video memory requisite.

The circuit diagram of FIG. 3 depicts beside a general scheme of the encoder, also the prediction and quantization loop of single pixels. According to a preferred embodiment, two distinct look-up tables of quantization coefficients, optimized for the compression of luma and chroma components, respectively, are defined. A multiplexer selects which of the two look-up tables stored in the respective ROM or PAL should be used depending on whether the system is compressing the luma or the chroma component.

A sample embodiment of the circuit of the quantizer is depicted in FIGS. 5 and 6. The decoder is depicted in FIG. 7.

It should be emphasized that the calculation of the prediction error is made in terms of moduli and signs. This permits simplifying the quantization operation by halving the number of levels on which to operate. As is generally known, the prediction error statistic is symmetric about the zero value.

FIG. 2 shows how the decoder and the encoder may be disabled by respective multiplexers controlled by an internal control bus. The interval control bus is connected to a microprocessor supervising the operation of the MPEG-2 decoder.

A dynamic management of the external memory may be implemented and therefore a marked increase of the available memory capacity may be determined by activating the encoder and the decoder. This may be very convenient. For example, assuming the external memory to be a 16 Mbit memory, about 8 Mbits may be made available as needed for other functions, such as graphic or teletext functions, for instance.

EXAMPLE OF COMPRESSION AT N BIT PER PIXEL

With reference to the scan scheme of a macroblock of 16*8 pixel of FIG. 8, after eventual motion compensation, it is assumed to compress in an independent way each horizontal line of 16 pels (for luma) and of 8 pels (for chroma).

The total number of bits utilized for the compression of the block is:

K+8+(C-1)*N where:

K=bits employed for coding the energy
8=bits used for the first scanned pixel
N=bits used for the quantization
(C-1)*N=bits employed for the DPCM coding of the remaining pixels For the case K=4, C=16, N=4, and for the luma we obtain a total of:

4+8+(16-1)*4=72 bit/block 1*16

For the case K=3, C=8, N=3, and for the chroma component for each macroblock we obtain a total of:

3+8+(8-1)*3=32 bit/block 1*8  8*32=256 bit/block 8*8

EXAMPLE OF COMPRESSION OF AN MPEG MACROBLOCK

Each macroblock is made by two 16*8 blocks of luminance and of two 8*8 blocks of chrominance; each macroblock is coded with a number of bits equal to:

(2*16*8*8)+(2*8*8*8)=3,072 bits luma chroma

In each PAL picture there are 1.620 macroblocks:
3,072*1,620=4,976,640 bits

It is known that the chrominance signal has a lower content of information presenting a band restricted to the lowest spatial frequencies. This implies a greater predictability of the chrominances themselves, that is, a greater efficiency of the ADPCM compression. By considering a 4 bit/pixel compression for the luminance and a 3 bit/pixel for the chrominance we would then obtain, by contrast:

(2*576)+(256*2)=1,664,704 bits luma chroma

Therefore, each frame occupies:
1,664,704*1.620=2,695,680 bits

The macroblock compression factor so obtained is equal to 1.85.

EXAMPLE OF APPLICATION TO AN MPEG DECODER

By taking into account the above relationships it is possible to reach the target of a reduction to about 8 Mbits of video memory by assuming such a compression of the MPEG decompressed I and P pictures. This result is attained by ADPCM recompressing the I and P pictures after MPEG decompression and before they are stored in the external memory. They will be then decompressed when read from the external memory as shown in FIG. 1.

The compression is applicable to an 16*8 block output from the I_DCT and motion compensation pipeline, according to an adaptive DPCM scheme. In particular, in the considered example for the 16*8 blocks of luminance subdivided in 16*1 blocks, a 4 bit compression is selected, whereas for the 8*8 blocks of chrominance, subdivided in 8*1 blocks a 3 bit compression is chosen.

Thus, for the PAL format case the memory requirement is as follows:

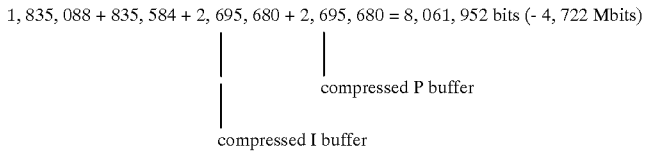

BAND GAIN RELATIVE TO THE ACCESS TO THE EXTERNAL VIDEO MEMORY

As may be observed, 8 chrominance samples (originally represented at 64 bits) have been compressed to 32 bits obtaining a 50% reduction in the number of cycles necessary to access to this information resident in the external video memory. In fact, if the video memory is organized in words of 16 bits as in the case of ADPCM decompression, two accesses are sufficient for reading the 32 bits to be decoded for obtaining the 8 pels, instead of four accesses.

In case of luminance, two lines of 16 pels are compressed by employing (72*2) 144 bits which is equal to 16*9. Only nine 16-bit words are necessary to store 144 bits, instead of 16*8*2=256 bits. Therefore, contrarily to what is described in the above noted prior European patent application No. 96830106.9 (Mar. 11, 1996) and No. 96830367.7 (Jun. 28, 1996), according to the method and architecture of the present invention an auxiliary ADPCM memory is no longer necessary.

EXAMPLE OF APPLICATION TO AN IQTV DEVICE

Hereinbelow, an application of the invention in an IQTV processor as used in digital TV receivers is described. A typical system's configuration of a TV set is depicted in FIG. 9. The signal source may be a satellite, a cable network or a radio broadcast as used for normal earth transmissions. Such a signal is demodulated by the tuner and the demodulator. A source of video signal may also be a so-called SCART connection to a video recorder.

The user selects the source by the use of an input selector which directs the video signal to the standard decoder. Depending on the standard of the input signal (PAL, SECAM or NTSC), the standard decode extracts the analog component of luminance and the two components of chrominance. These components are then sent to the analog/digital converter which outputs three digital streams in a format that may be, for example, a 4:2:2 format. This means that for each two horizontal samples of luminance, the converter samples one of each component of chrominance.

The signal, thus digitized, is in a so-called interlaced format, that is defined by a sequence of half-pictures (half-fields) which, for example, according to the PAL standard, are composed each by 288 video lines of 720 pels. These half-pictures are stored in Field Memory 1 at a 50 Hz frequency (PAL) and read at double that frequency (100 Hz). Therefore it is possible to double the half-field frequency by feeding the IQTV processor with a sequence of half-fields which will be subjected to various kinds of filtering. The device depicted in FIG. 10, processes in a digital mode the Y luminance samples and the U & V chrominance samples (the dimension of which is half that of the luminance samples).

The IQTV device is made up of the following blocks arranged in cascade.

NOISE REDUCER

This block is composed of two parts:

a) An impulsive noise filter that reduces sensibly the so-called "salt and pepper noise" without degrading the details of the image. This filter reduces all the isolated spurious pulses easing the burden of other filtering blocks downstream.

b) A Gaussian noise filter based on an algorithm exploiting the fact that the video information contained in consecutive half-pictures is highly correlated (which is exactly contrary to what happens with the Gaussian noise that is intrinsically uncorrelated to the image).

Therefore, Field Memory 2 of FIG. 10 is useful for implementing a semipicture delay to process in parallel two consecutive half-pictures. In this way, from the average of two consecutive half-pictures it is possible to eliminate uncorrelated information. Moreover, to consider motion that is intrinsic to video sequences and avoid the insurgence of streaming effects of the motion components, an inner motion detector permits determining a corrected average between a current pel and its corresponding pel of the preceding field.

SEMIFIELD FREQUENCY CONVERTER

This block is capable of transforming half-field sequences into full field sequences by implementing a conversion from the interlaced format to the progressive format. This is done without varying the half-field frequency by generating the missing lines either by way of simple duplication of the existing lines, or by way of interpolation starting from the available video lines.

The conversion of the half-field frequency permits realizing the 100/120 Hz interlaced format starting from the 50/60 Hz interlaced format. This transformation eliminates so-called "large area flicker" typical of the 50/60 Hz video applications.

For example, there are three possible ways of reconstructing a field every two half-fields: by way of median interpolation; by way of repetition of half-field lines; and by way of field insertion.

FORMAT CONVERTER

This block performs the following functions:

Horizontal compression, typical in case in which the user wishes to view a source image with an aspect ratio 4:3 on a 16:9 aspect ratio monitor.

Vertical expansion, when a film sequence with black bands in the upper and lower portion of the picture must be viewed without these black bands.

SHARPNESS ENHANCEMENT OF THE IMAGE

In this block the high frequencies belonging to the luminance component and present in correspondence of the boundaries of the details (contours)of the image are enhanced. On the contrary, the two chrominance components have a smaller band than luminance, thus the abruptness of color contours is enhanced with an advanced filtering process. Finally, the chip generates all the signals necessary for synchronizing all the internal functions of the system, and including the control signals for activating the half-field memories.

The present invention permits eliminating the use of the line memories for defining the compressing window required by the system described in the above-mentioned prior application EP-96830134.1. This is possible by using the novel technique of the invention for implementing the variance estimator which permits further increasing in the signal/noise ratio as compared with the variance estimator of prior art systems.

DESCRIPTION OF THE ADPCM SYSTEM

In describing the application of the present invention, let us assume that on Field Memory 1 is to be stored a PAL field at a 50 Hz frequency, but that the stored data is to be read at a double frequency (100 Hz) to implement the homonymous function. The picture that is stored in the Y Field Memory 1 of FIG. 11 is composed of the sequence of 288 video lines each of which is composed by 720 pels of luminance. These lines are scanned by way of processing windows of 16 pels each and on which compression is implemented. The block of pels of such a processing window are compressed by the Y ADPCM encoder and then stored in the memory. At the memory output, the same block of pels will be decompressed thus reconstructing a so-called raster stream of pels.

By assuming, for example, operating on a window defined by 16 pels of a same video line and on the luminance component, the selected pels feed the Y ADPCM encoder that is depicted in FIG. 12. The luminance field is therefore divided in rectangular blocks of 1*16 or more pels, generally i*C (1 line and C columns). The maximum effectiveness of the compression is obtained when C is chosen as an integer divider of the horizontal pel dimension of the picture.

1) SELECTION AND CODING OF THE QUANTIZER

The process of selecting the quantizer is based upon the calculation of the modulus of the maximum difference between any two adjacent pels included in the processing window. Such a modulus represents the local power of the selected block of pels, because the higher its value the less is the correlation between adjacent pels. The selector of the quantizer VARIANCE ESTIMATOR (depicted in FIG. 13 for the Y ADPCM encoder and in FIG. 18 for the U & V ADPCM encoder) detects, by the use of an array of comparators, the range to which such a modulus of the maximum difference belongs. It further outputs the address of the look-up table containing the particular set of coefficients which, when used for quantizing the differences among adjacent pels of the processing window, introduce the minimum error, as compared to the error introduced by prior art systems.

Each quantizer (that is each set of coefficients of quantization) may be suitably designed for contributing to achieve such a minimization of the error. An example of architecture of a circuit for implementing such an estimation of the variance is depicted in FIG. 13 for the Y ADPCM encoder and in FIG. 18 for the U & V ADPCM encoder.

2) CODING OF THE FIRST PIXEL OF EACH LINE OF THE BLOCK

The first pixel of the block, indicated above as P(i, 1) is not subject to any prediction and therefore it is coded according to its original resolution by a number B of bits.

The scanning path of the window is chosen so as to adapt the decompression to the need of obtaining a raster format at the output of the FIELD MEMORY.

3) DECORRELATION, QUANTIZATION AND CODING OF ALL THE OTHER PIXELS OF THE BLOCK

For each pixel P of the block, the pixel P' is adopted as predictor according to what was defined above. It must be noticed that this predictor, following the described scanning order, has already been quantized and reconstructed, and therefore is not obtained from the original picture. This permits a better control of the quality of the picture coherent with the ADPCM technique.

EXAMPLE OF COMPRESSION AT N BITS PER PIXEL

With reference to the example of FIG. 22, a block 1*C of pixels upstream of the Y (or upstream of the U & V) ADPCM encoder is taken in consideration. The total bits employed for the block compression are equal to:
K+8+(C−1)*N
where:
K=bits employed for power coding.
8=bits employed for the first pixel in the scanning of each line.
N=bits employed for quantization
(C−1)*N=bits employed for DPCM coding of the remaining pixels In the case: K=4, C=16, N=4, the following total is obtained:
4+8+(16−1)*4=72 bits/block
In the case: K=3, C=16, N=3, the following total is obtained:
3+8+(16−1)*3=56 bits/block
In the case: K=3, C=8, N=3, the following total is obtained:
3+8+(8−1)*3=32 bits/block versus 16*8=128 bits requested by the original representation for the case of 16 columns and 8*8=64 bits for the case of 8 columns.

EXAMPLE OF COMPRESSION OF A PAL 4:2:2 FIELD

Each field consists of 12,960 1*16 luminance blocks and of 6,336 1*16+288 1*8 blocks for each chrominance component Each field occupies the following number of bits:

| | | | |
|---|---|---|---|
| - Y component: | (720*288) * 8 | = | 1,658,880 bits |
| - U component: | (360*288) * 8 | = | 829,400 bits |
| - V Component: | (360*288) * 8 | = | 829,400 bits |
| | Total: | = | 3,317,760 bits |

By considering for instance a 4 bit/pixel compression of luminance and a 3 bit/pixel compression of chrominance, we obtain:

| | | |
|---|---|---|
| - Y component: | [(720*288) / (1*16)] * 72 = | 933,120 bits |
| - U component: | [(352*288) / (1*16)] * 56 + 288*32 = | 364,032 bits |
| - V component: | [(360*288) / (1*16)] * 56 + 288*32 = | 364,032 bits |
| | Total: | 1,661,184 bits |

The compression factor obtained is equal to 1,997, thus enabling a 50% compression of each field. A block diagram of the encoder of the luminance component is depicted in FIG. 12 and the encoder of the chrominance components is depicted in FIG. 17.

EXAMPLE OF DECOMPRESSION OF A PAL 4:2:2 FIELD

During the decompression phase, the raster format must be generated. Referring to the example in FIGS. 22 and 23 and assuming to be decompressing all the pels belonging to line 1 and to be starting decompression of the pels of the $m^{th}$ and $(m+1)_{th}$ block of the luminance component, the following bits must be read from the $m^{th}$ block:

K=4 bits employed for power coding
8 bits employed for the first pixel of the portion of line 1
C−1*N=60 bits employed for DPCM coding of remaining pixels of line 1

In this way the Y ADPCM decoder block of the diagram of FIG. 16 shall have all the information required and sufficient to decompress all the 16 pel groups of each 1*16 block and belonging to the video line that is going to be subjected further processing.

The block diagram of the decoder is depicted in FIG. 16. Similar considerations holds for each chrominance components as well.

EXAMPLE OF APPLICATION TO AN IOTV DECODER

Considering the relations shown above, it is possible to define the architecture for a global memory requirement reduced to 1.6 Mbits for each field if a 50% compression of FIELD MEMORIES is assumed. This result is reached by recompressing the fields stored upstream the NOISE REDUCTION block, according to the diagram shown in FIG. 11.

The compression is adapted to the block 1*16 output by the WINDOW GENERATOR according to the ADPCM scheme. In particular for the 1*16 luminance blocks, a 4 bit compression has been chosen, while for the 1*16 chrominance blocks a 3 bit compression has been selected. Therefore the memory requisite of the 2 FIELD MEMORIES is:
1,661,184*2=3,322,368 bits Considering the present aim of integrating the FIELD MEMORIES in the SQTV processor chip without resorting to external memory devices, the above achievement of the invention implies a significative saving of silicon area for such realization.

I claim:

1. A recompression and decompression method according to an adaptive differential pulse code modulation scheme (ADPCM) for a stream of digital data representing an MPEG decoded digital video signal, before being stored in a video memory and during reading of said data from said video memory, respectively, to be then processed by a video processor generating three video signals controlling a display monitor, the recompression and decompression method for reducing the video memory requirement of an MPEG video decoder, the method comprising the steps of:

defining an ADPCM processing window including a predetermined block of adjacent pels belonging to a same horizontal video line;

calculating moduli of a difference between every two adjacent pels for each processing window;

detecting a maximum value of a set of values of the moduli of the differences between adjacent pels for each processing window;

storing the detected current maximum value of each processing window in a register;

comparing said current maximum value stored with a predetermined number of thresholds defining as many ranges of said value corresponding to a number of selectable addresses of a look-up table containing a corresponding number of sets of quantization parameters;

selecting an address as a function of the range to which said current maximum value belongs;

loading a parametric quantizer with the set of quantization parameters read from said look-up table as a function of said address; and updating said current maximum value stored for each new block of input pels as identified by said processing window.

2. The method according to claim 1, wherein the step of defining the ADPCM processing window comprises defining the ADPCM processing window to have a width corresponding to 16 pels of a same horizontal video line.

3. A recompression and decompression method according to an adaptive differential pulse code modulation scheme (ADPCM) for a stream of digital data representing an MPEG decoded digital video signal, before being stored in a video memory and during reading of said data from said video memory, respectively, to be then processed by a video processor generating three video signals controlling a display monitor, the recompression and decompression method for reducing the video memory requirement of an SQTV video processor, the method comprising the steps of:

defining an ADPCM processing window including a predetermined block of adjacent pels belonging to a same horizontal video line;

calculating moduli of a difference between every two adjacent pels for each processing window;

detecting a maximum value of a set of values of the moduli of the differences between adjacent pels for each processing window;

storing the detected current maximum value of each processing window in a register;

comparing said current maximum value stored with a predetermined number of thresholds defining as many ranges of said value corresponding to a number of selectable addresses of a look-up table containing a corresponding number of sets of quantization parameters;

selecting an address as a function of the range to which said current maximum value belongs;

loading a parametric quantizer with the set of quantization parameters read from said look-up table as a function of said address; and updating said current maximum value stored for each new block of input pels as identified by said processing window.

4. The method according to claim 3, wherein the step of defining the ADPCM processing window comprises defining the ADPCM processing window to have a width corresponding to 16 pels of a same horizontal video line.

5. An MPEG-2 video decoder for interfacing with a control bus and a data processing bus for video pictures to be written and read in respective buffers external to a core of a video decoder, the video deocer comprising a first fifo buffer for data acquisition and writing of the compressed data in a first bit buffer of an external DRAM memory, a start code detector circuit synchronized by a controller, a bidirectional buffer for on screen data display, a variable length decoder of the compressed data input stream, an MPEG-2 decompression pipeline of the data decoded by said variable length decoder and comprising a run length decoder, an inverse quantizer circuit, an inverse discrete cosine transform processor, a recompressing and coding circuit according to an adaptive differential pulse code modulation scheme (ADPCM), said video decoder comprising a variance estimator suited to recompress the data relative to I and P pictures to be temporarily written and subsequently read from respective buffers organized in said external memory;

a decoding and decompressing circuit of said data relative to said I and P pictures read from the respective buffers of said memory, generating a stream of decoded and decompressed data relative to the I and P pictures, multiplexing means enabling/disabling said ADPCM recompressing, coding, decoding and ADPCM decompressing circuits;

means actuating said selections upon commands sent through said control bus;

a predictor generating circuit;

a macroblock-scan to raster-scan conversion circuit of a current B-picture upstream of a display unit;

said variance estimator operating on blocks of data of a certain number of pels all belonging to a same horizontal video line as identified by a processing window;

an array of synchronized bistable circuits of the same number of the number of bits used for coding each input pel of the variance estimator circuit delaying by a primary clock period each input pel;

a subtractor circuit fed with the delayed pel and with a successive pel and sequentially outputting difference values between every two successive pels of the digital video data input stream;

a first circuit fed with the stream output by said subtractor circuit and outputting a stream of values of the modulus of the differences between every two successive input pels;

a first comparator and a first two input multiplexer controlled by the output of said first comparator, a first input of said comparator and of said multiplexer being connected to the output of said first circuit, the second input of said first comparator and of said first multiplexer being fed with a value currently assumed as the maximum temporary value of said values of modulus of differences, stored in a register, and an input of which is coupled to the output of said first multiplexer;

an array of comparators of the same number of pels of said block of pels all belonging to the same horizontal line included in said processing window, a common input of which is coupled to a common node of the output of said first register and of second inputs of said first comparator and of said first multiplexer, each having a second input to which a respective threshold value is fed;

an array of output AND gates functionally driven by said array of comparators, generating a bus of the same number of bits of the number of pels of said processing window;

a combinatory logic circuit driven by said generated bus producing a number of control bits equivalent to the logarithm in base two of the number of lines of said bus rounded to the upper integer, for a second multiplexer outputting one of a number of addresses equivalent to the number of ranges defined by said thresholds; and the output address pointing a set of coefficients of quantization among a plurality of sets permanently stored in a look-up table as a function of the estimated power of each block of pels included in the processing window.

6. A video decoder for recompression and decompression according to an adaptive differential pulse code modulation scheme (ADPCM) for a stream of digital data representing an MPEG decoded digital video signal, said video decoder comprising:

window defining means for defining an ADPCM processing window including a predetermined block of adjacent pels belonging to a same horizontal video line;

moduli calculating means for calculating moduli of a difference between every two adjacent pels for each processing window;

maximum value detecting means for detecting a maximum value of a set of values of the moduli of the differences between adjacent pels for each processing window;

a register for storing the detected current maximum value of each processing window;

comparing means for comparing said current maximum value stored with a predetermined number of thresholds defining as many ranges of said value corresponding to a number of selectable addresses of a look-up table containing a corresponding number of sets of quantization parameters;

selecting means for selecting an address as a function of the range to which said current maximum value belongs;

loading means for loading a parametric quantizer with the set of quantization parameters read from said look-up table as a function of said address; and updating means for updating said current maximum value stored for each new block of input pels as identified by said processing window.

7. The video decoder according to claim 6, wherein said window defining means comprises means for defining the ADPCM processing window to have a width corresponding to 16 pels of a same horizontal video line.

8. An SQTV processor for converting a video signal received at an interlaced scanning frequency of 50 or 60 Hz into an interlaced scanning frequency of 100 or 120 Hz, respectively, and implementing algorithms of noise filtering and of edge definition, said SQTV processor comprising:

an analog-digital converter of analog input signals of luminance and chrominance;

at least a half-field memory where digital blocks of luminance (Y) value and blocks of values of each one of the two chrominance (U, V) components of said converted video signals are stored;

at least one fifo register for digital values read from said half-field memory containing the pixels of a whole line of each half-field;

a noise filtering block comprising means for compressing and coding said converted video signals according to an adaptive differential pulse code modulation (ADPCM) scheme that comprises a variance estimator circuit of the digital values to be stored in said half-field memory;

means of ADPCM decoding and decompressing of data read from said half-field memory;

a sampling frequency converter of said fields from 50 or 60 Hz to 100 or 120 Hz;

means for converting the vertical format, means for edge definition enhancement and means for digital-to-analog conversion of the processed luminance and chrominance (YUV) signals;

said variance estimator operating on blocks of data of a certain number of pels all belonging to a same horizontal video line as identified by a processing window;

an array of synchronized bistable circuits of the same number of the number of bits used for coding each input pel of the variance estimator circuit delaying by a primary clock period each input pel;

a subtractor circuit fed with the delayed pel and with a successive pel and sequentially outputting difference values between every two successive pels of the digital video data input stream;

a first circuit fed with the stream output by said subtractor circuit and outputting a stream of values of the modulus of the differences between every two successive input pels;

a first comparator and a first two input multiplexer controlled by the output of said first comparator, a first input of said comparator and of said multiplexer being connected to the output of said first circuit, the second input of said first comparator and of said first multiplexer being fed with a value currently assumed as the maximum temporary value of said values of modulus of differences, stored in a register, and an input of which is coupled to the output of said first multiplexer;

an array of comparators of the same number of pels of said block of pels all belonging to the same horizontal line included in said processing window, a common input of which is coupled to a common node of the output of said first register and of second inputs of said first comparator and of said first multiplexer, each having a second input to which a respective threshold value is fed;

an array of output AND gates functionally driven by said array of comparators, generating a bus of the same number of bits of the number of pels of said processing window;

a combinatory logic circuit driven by said generated bus producing a number of control bits equivalent to the logarithm in base two of the number of lines of said bus rounded to the upper integer, for a second multiplexer outputting one of a number of addresses equivalent to the number of ranges defined by said thresholds; and the output address pointing a set of coefficients of quantization among a plurality of sets permanently stored in a look-up table as a function of the estimated power of each block of pels included in the processing window.

9. The SQTV processor according to claim 8, further comprising:

a second half-field memory used as a half-field delay for interpolation functions on half-fields to filter impulsive and Gaussian noises by said noise filtering block;

means for compressing and coding said converted video signal according to an adaptive differential pulse code modulation compression scheme of digital values to be stored in said second half-field memory; and decoding and decompressing means for data read from said second half-field memory.

10. The SQTV processor according to claim 9, wherein said said half-field memories are organized in an external DRAM device.

11. The SQTV processor according to claim 9, wherein said half-field memories are integrated on the same SQTV processor chip.

* * * * *

UNITED STATES PATENT AND TRADEMARK OFFICE
CERTIFICATE OF CORRECTION

PATENT : 6,023,295
DATED : February 8, 2000
INVENTOR(S): Danilo Pau

It is certified that error appears in the above-identified patent and that said Letters Patent is hereby corrected as shown below:

{22} Filed:  Strike: "Sep. 9, 1996"
Insert: –Sep. 8, 1997–

Column 6, Line 38  Strike: "A5"
Insert: –A15–

Column 13, Line 1  Strike:
$$1,835,088 + 835,584 + 2,695,680 + 2,695,680 = 8,061,952 \text{ bits } (-4,722 \text{ Mbits})$$

with annotations: "compressed I buffer" and "compressed P buffer"

Insert:
$$1,835,008 + 835,584 + 2,695,680 + 2,695,680 = 8,061,952 \text{ bits } (\rightarrow 4,722 \text{ Mbits})$$

with annotations: "compressed I buffer" and "compressed P buffer"

UNITED STATES PATENT AND TRADEMARK OFFICE
CERTIFICATE OF CORRECTION

PATENT : 6,023,295
DATED : February 8, 2000
INVENTOR(S): Danilo Pau

It is certified that error appears in the above-identified patent and that said Letters Patent is hereby corrected as shown below:

Column 15, Line 35    Strike: "i*C"
                               Insert: $-1*C-$ Column 17, Line 11    Strike: "$(m+1)_{th}$"
                               Insert: $-(m+1)^{th}-$ Signed and Sealed this First Day of May, 2001

Attest:

NICHOLAS P. GODICI

*Attesting Officer*      *Acting Director of the United States Patent and Trademark Office*